(12) United States Patent
Mazar et al.

(10) Patent No.: US 12,227,258 B2
(45) Date of Patent: Feb. 18, 2025

(54) FOLDABLE PERSONAL VEHICLE

(71) Applicant: Doona Holdings Ltd., Quarry Bay (HK)

(72) Inventors: Yoav Shabtai Mazar, Herzelia (IL); Maxim Holtzman, Jerusalem (IL)

(73) Assignee: Doona Holdings Ltd., Quarry Bay (HK)

( * ) Notice: Subject to any disclaimer, the term of this patent is extended or adjusted under 35 U.S.C. 154(b) by 0 days.

(21) Appl. No.: 18/226,420

(22) Filed: Jul. 26, 2023

(65) Prior Publication Data

US 2023/0365216 A1    Nov. 16, 2023

Related U.S. Application Data

(63) Continuation of application No. 17/474,784, filed on Sep. 14, 2021, now Pat. No. 11,745,820, which is a
(Continued)

(30) Foreign Application Priority Data

Dec. 12, 2016    (IL) .......................................... 249515

(51) Int. Cl.
*B62K 13/04*    (2006.01)
*B62B 7/12*    (2006.01)
(Continued)

(52) U.S. Cl.
CPC ................ *B62K 13/04* (2013.01); *B62B 7/12* (2013.01); *B62K 9/02* (2013.01); *B62K 15/008* (2013.01)

(58) Field of Classification Search
CPC ........ B62K 13/04; B62K 9/02; B62K 15/008; B62B 7/12
(Continued)

(56) References Cited

U.S. PATENT DOCUMENTS

| 1,106,939 A | 8/1914 | Gutmann |
| 2,194,161 A | 3/1940 | Cobb |

(Continued)

FOREIGN PATENT DOCUMENTS

| CN | 2551558 Y | 5/2003 |
| CN | 2574978 Y | 9/2003 |

(Continued)

OTHER PUBLICATIONS

Ilmo Folding Tricycle for Kids, http://www.iimo-life.com/vehicle2_01.htm.
(Continued)

*Primary Examiner* — Hau V Phan
(74) *Attorney, Agent, or Firm* — Dorsey & Whitney LLP

(57) ABSTRACT

A foldable personal such as a tricycle which can be convertible into a stroller, is configured for accommodating a child therein and for preventing, when desired, the child from being able to steer the vehicle, vehicle having an operational state and a storage state, in which it can take an extremely compact form. The vehicle has a longitudinal axis lying in its vertical plane of symmetry and having a horizontal reference plane perpendicular to the plane of symmetry, and it takes its compact form in the storage state both in the direction along its longitudinal axis and in the directions perpendicular to this axis both along the plane of symmetry and perpendicular to the plane of symmetry.

12 Claims, 11 Drawing Sheets

Related U.S. Application Data continuation of application No. 17/074,057, filed on Oct. 19, 2020, now Pat. No. 11,148,746, which is a continuation of application No. 15/836,443, filed on Dec. 8, 2017, now Pat. No. 10,933,938.

(51) Int. Cl.
  *B62K 9/02* (2006.01)
  *B62K 15/00* (2006.01)

(58) Field of Classification Search
  USPC .......................................................... 280/643
  See application file for complete search history.

(56) References Cited

U.S. PATENT DOCUMENTS

| | | | |
|---|---|---|---|
| 2,212,741 A | 8/1940 | Ralph | |
| 3,639,748 A | 2/1972 | Pearson et al. | |
| 3,869,167 A | 3/1975 | Muller | |
| 3,905,618 A | 9/1975 | Miranda | |
| 4,974,125 A | 11/1990 | Mcgehee | |
| 6,152,473 A | 11/2000 | Shih | |
| 6,530,589 B1* | 3/2003 | Ma | B62K 9/00 280/270 |
| 6,575,486 B2 | 6/2003 | Ma | |
| 6,609,723 B2 | 8/2003 | Chuang | |
| 6,612,598 B2 | 9/2003 | Wu | |
| 6,793,231 B2 | 9/2004 | Wu | |
| 6,840,527 B1 | 1/2005 | Michelau et al. | |
| 6,874,802 B2 | 4/2005 | Gunter et al. | |
| 6,935,649 B2* | 8/2005 | Lim | B62H 7/00 280/282 |
| 6,966,572 B2 | 11/2005 | Michelau et al. | |
| D525,568 S | 7/2006 | Baron | |
| 7,240,907 B2 | 7/2007 | Chen | |
| D555,045 S | 11/2007 | On | |
| D571,866 S | 6/2008 | On | |
| D594,788 S | 6/2009 | Hartlaub et al. | |
| D596,090 S | 7/2009 | Tufte | |
| 7,568,720 B2 | 8/2009 | Golias | |
| D604,777 S | 11/2009 | On | |
| D627,265 S | 11/2010 | On | |
| D659,056 S | 5/2012 | Bricker et al. | |
| 8,308,178 B2* | 11/2012 | Hoerdum | B62K 15/008 280/278 |
| 8,517,406 B2 | 8/2013 | Diekman et al. | |
| 8,844,960 B2* | 9/2014 | Young | B62K 15/00 280/278 |
| 9,039,025 B1 | 5/2015 | Shih | |
| D735,090 S | 7/2015 | Baron | |
| 9,114,842 B2 | 8/2015 | Bartels | |
| 9,321,499 B2* | 4/2016 | Kim | B62K 9/00 |
| 9,493,205 B2 | 11/2016 | Ben Meir | |
| D777,607 S | 1/2017 | Fitzwater et al. | |
| D787,378 S | 5/2017 | Ostergaard | |
| 10,011,316 B2 | 7/2018 | Ben Meir | |
| 10,336,394 B2 | 7/2019 | Fitzwater et al. | |
| 10,589,772 B2 | 3/2020 | O Connell et al. | |
| 10,618,590 B2 | 4/2020 | Rambaud | |
| 10,933,938 B2* | 3/2021 | Mazar | B62B 7/042 |
| 11,148,746 B2* | 10/2021 | Mazar | B62K 13/04 |
| 11,745,820 B2* | 9/2023 | Mazar | B62B 7/042 280/643 |
| 2003/0080533 A1 | 5/2003 | Ma | |
| 2003/0098567 A1 | 5/2003 | Chuang | |
| 2004/0066018 A1 | 4/2004 | Li | |
| 2007/0052189 A1 | 3/2007 | Golias | |
| 2007/0205577 A1 | 9/2007 | Lau | |
| 2008/0277901 A1* | 11/2008 | Catelli | B62K 9/02 280/287 |
| 2011/0074125 A1 | 3/2011 | Aiken et al. | |
| 2011/0278815 A1 | 11/2011 | Khare et al. | |
| 2013/0038030 A1 | 2/2013 | Baron | |
| 2013/0056949 A1 | 3/2013 | Bricker et al. | |
| 2013/0300084 A1 | 11/2013 | Baron | |
| 2014/0103616 A1* | 4/2014 | Young | B62K 15/008 280/278 |
| 2014/0159335 A1 | 6/2014 | Baron | |
| 2014/0217696 A1 | 8/2014 | Bartels | |
| 2014/0291959 A1 | 10/2014 | Yap | |
| 2015/0068828 A1 | 3/2015 | Delgatty et al. | |
| 2015/0158544 A1 | 6/2015 | Herzel et al. | |
| 2015/0225036 A1 | 8/2015 | Baron | |
| 2016/0016629 A1 | 1/2016 | Wang et al. | |
| 2016/0347397 A1 | 12/2016 | Etzelsberger et al. | |
| 2016/0355230 A1 | 12/2016 | Fitzwater et al. | |
| 2016/0355231 A1 | 12/2016 | Barenbrug et al. | |

FOREIGN PATENT DOCUMENTS

| | | |
|---|---|---|
| CN | 103192862 A | 7/2013 |
| CN | 203450279 U | 2/2014 |
| CN | 103754304 A | 4/2014 |
| CN | 203638020 U | 6/2014 |
| CN | 104661907 A | 5/2015 |
| CN | 204687877 U | 10/2015 |
| CN | 204895718 U | 12/2015 |
| CN | 105270530 A | 1/2016 |
| CN | 205022789 U | 2/2016 |
| CN | 105501355 A | 4/2016 |
| CN | 205440711 U | 8/2016 |
| CN | 205615647 U | 10/2016 |
| EM | 0025272000001 | 8/2014 |
| EP | 2623407 A1 | 8/2013 |
| EP | 2670653 A1 | 12/2013 |
| FR | 2955080 A1 | 7/2011 |
| IT | CT2010A000015 | 1/2010 |
| JP | 3088707 U | 7/2002 |
| JP | 3090304 U | 9/2002 |
| JP | 2003175876 A | 6/2003 |
| JP | 2006298161 A | 11/2006 |
| JP | 2014088076 A | 5/2014 |
| JP | 2015128921 A | 7/2015 |
| JP | 2016130046 A | 7/2016 |
| KR | 20140115601 A | 10/2014 |
| RU | 2025386 C1 | 12/1994 |
| SU | 1244001 A1 | 7/1986 |
| SU | 1761579 | 9/1992 |
| WO | 2004096619 A1 | 11/2004 |
| WO | 2013036990 A2 | 3/2013 |

OTHER PUBLICATIONS

SmarTrike TMS | All About Media. Retrieved from internet on Feb. 26, 2024. https://www.youtube.com/watch?v=aUXbGnfB7vs, 2016, 2 pages.

* cited by examiner

FOLDABLE PERSONAL VEHICLE

TECHNOLOGICAL FIELD

The subject matter of the present application relates to foldable personal vehicles, in particular in the field of children's toys and vehicle products.

BACKGROUND

Foldable personal vehicles such as scooters, vehicles and bicycles are well known for both adults and children. For children, it may sometimes be beneficial that the vehicle can be folded for compact storing and carrying.

There are known a great variety of such foldable vehicles, centered around two basic principles: disassembly and folding. Under the first group, the vehicle is disassembled to basic parts, which can be fitted compactly together. Under the second group, most parts of the vehicle maintain their inter-connections but can assume an operational state, in which they function as a vehicle and a storage, folded state, in which the orientation and/or position of the parts changes with respect to one another.

Vehicles of the above second group are described, for example in U.S. Pat. Nos. 6,152,473, 6,530,589, and http://www.iimo-life.com/vehicle2_01.htm, the latter being a product sold as IIMO Folding Tricycle.

The presently disclosed subject matter refers to vehicles of the second group described above.

GENERAL DESCRIPTION

The subject matter of the present application refers to a foldable personal vehicle having an operational state and a storage state, in which it can take an extremely compact form. The vehicle has a longitudinal axis lying in its vertical plane of symmetry and having a horizontal reference plane perpendicular to the plane of symmetry, and it takes its compact form in the storage state both in the direction along its longitudinal axis and in the directions perpendicular to this axis both along the plane of symmetry and a vertical plane perpendicular to the plane of symmetry.

In accordance with a first aspect of the presently disclosed subject matter, the above vehicle can comprise:
 a body member having an upper surface holding a seat, front and rear ends spaced from each other along the longitudinal axis, a right rear side surface and a left rear side surface both disposed adjacent the rear end of the body member and spaced from each other in a direction perpendicular to the plane of symmetry;
 a front bar and a front wheel mounted thereto, the front bar being at least indirectly pivotally articulated to the body member adjacent the front end thereof to take an operational and a storage orientation;
 a right rear leg and a left rear leg each having a leg distal end with a rear wheel and a leg proximal end, at which the leg is pivotally articulated to the respective rear side surface of the body member to take an operational and a storage orientation, at least one of the legs having a connection area between the leg proximal end and the leg distal end; and
 at least one connection member connecting at least indirectly the front bar with the connection area of at least one of the legs so that pivoting the front bar between its operational and storage orientations causes the at least one connection member to pivot the rear legs along the respective rear side surface of the body member, between their respective operational and storage orientations.

Due to the pivotal articulation of the rear legs' proximal ends to the right and left rear side surfaces of the body member and the use of the above connection area/s and connection member/s for such articulation, the rear legs of the vehicle can be free of any common elements extending therebetween at locations thereon spaced from the legs' proximal ends, for pivotally connecting the legs to the body member. This allows the rear legs' pivoting angle to be so large that, in the storage state of the vehicle, they can take a position, in which at least a majority of the area of each leg overlaps with at least a majority of the area of the body member, as seen in a side view of the vehicle, thereby allowing to essentially reduce dimensions of the vehicle in this state both along the longitudinal axis of the vehicle and perpendicular to this axis along its plane of symmetry. This means that in the storage state of the vehicle each rear leg can be fully or almost fully coextensive with the body member at least along a majority of their longitudinal dimensions, e.g., each rear leg can have its distal end close to the front end of the body member to the extent that this end (not including the associated rear wheel) does not essentially protrude frontward from the front end of the body member. If in this case the front bar is of the kind that in its storage orientation the front wheel is disposed in front of the body member, at least a majority of each rear leg with the associated rear wheel, as seen in the side view of the vehicle in its storage state, can be accommodated between the body member's rear end and the front wheel, allowing thereby to essentially reduce the length of the vehicle in this state along its longitudinal axis.

In view of the above, each leg can have such shape and width relative to those of the body member that, in the storage state of the vehicle as seen in its side view, they can overlap not only along a majority of their lengths as described above but also along a majority of their heights, i.e. in the direction perpendicular to the longitudinal axis and along the plane of symmetry, allowing to essentially reduce the overall height of the vehicle in this direction in the storage state.

The pivotal articulation of each of the right and left rear legs of the vehicle relative to the corresponding rear side surface of the body member can be provided by means of a corresponding articulation axle having an outer portion protruding from the associated rear side surface of the body member and freely received in a through-channel formed at the proximal end of the rear leg, which extends between inner and outer side surfaces of the rear leg. The articulation axles can each be unitarily formed with the body member or fixedly mounted thereto by means of an inner portion of the axle. In any case, the outer portion of the each axle, i.e. its portion protruding from the associated rear side surface of the body member, can be configured to enter the channel from the inner side surface of the leg at its proximal end and fixedly engage, with its axle free end, a stopper disposed adjacent the outer side surface of the leg, so as to allow pivoting of the leg about the axle while preventing the leg from being dissembled from the axle. This can be done, for example, by the axle engagement end being configured to be threaded into a corresponding nut, which constitutes the stopper and is received within a pocket in the outer side surface of the leg at its proximal end.

Alternatively, each articulation axle can protrude from the inner side surface of the corresponding rear leg at its proximal end, being unitarily formed or fixedly mounted thereto, and can be pivotally received within the body member at the corresponding rear side surface thereof.

The right and left articulation axles can be spaced from the plane of symmetry of the vehicle or meet thereat. In the latter case, the two articulation axles can be formed as a single axle body having a central inner portion disposed within the body member and two lateral outer portions protruding from the rear side surfaces thereof as described above.

The inner and outer portions of each of the articulation axles can be collinear and extend along a single rear pivot axis or they can be angled with respect to each other.

The articulation axles of the two rear legs, or at least their outer portions, can extend along their respective rear pivot axes at a non-zero angle therebetween, each axis intersecting the rear side surface of the body member at a respective right and left rear articulation point.

The rear pivot axes of the two legs can each form an acute angle with the reference plane when seen in the rear view of the vehicle. This can allow obtaining an increased spacing between the rear legs' distal ends in their operational orientation relative to that, which these legs would have with the pivot axes lying in a plane parallel to the reference plane.

In addition or alternatively, each of the right and left rear pivot axes can be oriented at an acute angle with respect to the plane of symmetry of the vehicle. In this case, the rear legs' pivoting about the rear pivot axes from the operational to the storage orientation can allow their distal ends to get closer to the plane of symmetry, e.g., to become spaced from this plane to the same or about the same extent as their proximal ends, thereby improving the 'storage state' compactness of the vehicle in the direction perpendicular to the plane of symmetry.

In case the pivot axes form the acute angles both with the plane of symmetry and with the plane perpendicular to the plane of symmetry, the above mentioned 'storage state' compactness is achieved in spite of the increased spacing between the rear legs' distal ends in the operational state of the vehicle.

The body member can have a front body portion with its right and left front side surfaces and a rear body portion with its right and left rear side surfaces. The right and left front side surfaces can be disposed closer to the plane of symmetry than the rear right and left side surfaces, meaning that the rear body portion can be wider than the front body portion in the direction perpendicular to the plane of symmetry.

In addition, the rear portion of the body member can have a converging configuration as seen in at least one of its plan and rear views, provided by the corresponding orientation of the right and left rear side surfaces of the rear body portion. In this case, the inner side surface of each rear leg adjacent its proximal end can be oriented in the same way as, and be coextensive with, the corresponding rear side surface of the body member, so that these surfaces can be in intimate contact with each other in both the storage and the operational state of the vehicle. For example, the orientation of each of the right and left couples of the contacting rear side surface of the body member and inner side surface of the rear leg at its proximal end can be such as to provide one or both of the above acute angles of the right and left pivot axes, in which case these axes can be perpendicular to the corresponding contacting surfaces.

The body member can be in the form of a unitary body or it can be assembled from a number of elements. For example, these elements can include right and left body halves assembled so that their rims meet at the plane of symmetry of the vehicle and so as to define therebetween an at least partially hollow interior.

The front bar can extend along a front bar axis between a front wheel end of the front bar associated with the front wheel, and a handlebar end associated with handlebars. The front bar axis can form an angle with the longitudinal axis of the vehicle in the operational orientation of the bar taken by it in the operational state of the vehicle, which is essentially greater than that in the storage orientation of the front bar taken by it in the storage state of the vehicle. Specifically, the arrangement can be such that in the storage orientation of the front bar, the front bar axis forms with the longitudinal axis an angle not greater than 25 deg., more particularly, not greater than 20 deg., and still more particularly not greater than 15 deg. Optionally, the front bar axis can be parallel or almost parallel to the longitudinal axis in the storage state of the vehicle.

The front bar can constitute a part of a front assembly, which further comprises an articulation member, by virtue of which the front bar is pivotally articulated to the front end of the body member about a front pivot axis, and which is connected to the connection member/s. The front pivot axis can be spaced from the front bar axis so that in the operational orientation of the front bar in the operational state of the vehicle, the front bar is disposed in front of the body member, and in its storage orientation in the storage state of the vehicle, the front bar is disposed above and extends along the upper surface of the body member along at least a majority of the length of the front bar.

By virtue of the above configuration, the front bar can be so oriented in the storage state of the vehicle as to be upwardly spaced from the longitudinal axis to a distance shorter than that of the highest point of the vehicle, other than any point of the front bar itself. This highest point can be, for example, the highest point of the front wheel and/or the seat in the storage state of the vehicle.

The articulating member can have a front-bar associated portion, which embraces the front bar in a manner allowing the front bar to revolve about the front bar axis, a rear-legs associated portion, to which the at least one connection member is attached at its end opposite the end, at which it is attached to the connection area/s of the rear leg/s, and a body-member associated portion, at which the articulating member is pivotally articulated to the front end of the body member.

The at least one connection member can be made of a rigid material so that its length is maintained constant during operation of the vehicle and when the state of the vehicle is changed. More particularly, the connection member can be rigid enough to be able, when pushed by the articulating member, to push accordingly the rear legs from their storage orientation to their operational orientation. The vehicle can comprise two such connection members, right and left, each connecting the articulating member with the connection area of the respective right and left rear leg.

The vehicle can further comprise pedals detachably mountable to the front wheel or integrally assembled therewith.

The vehicle can further be configured for adjusting the position of the seat along the body member.

The vehicle can be configured for allowing its user occupying the seat, to steer the vehicle by his own or preventing the user from such steering, while allowing the vehicle to be steered from its rear via a steering handle operated by another person. In this case, the vehicle can have one or more of the following features:

a non-integral design of the front bar, whose upper and lower portions can be locked to each other to behave as a single integral unit steerable by operating the handlebars, and unlocked from each other allowing the lower portion to be steered by a separate steering mechanism not including the upper portion, and allowing a desired functionality of the upper portion without having any influence on the steering of the lower portion;

a front bar locking clamp for locking at least at least an upper portion the front bar to an element of the vehicle, such as e.g., its securing frame, which is not movable when in the operational state of the vehicle, to prevent the possibility of rotating the front bar or its upper portion about the front bar axis by operating its handlebars;

a foldable rear steering mechanism for use with a rotatable rear steering handle when mounted to the rear end of the body member, the mechanism connecting the handle with the front bar or at least its lower portion so that manipulation of the handle causes the front bar or its lower portion to rotate about the front bar axis for steering the vehicle;

a footrest fixedly mountable at least indirectly to the body member at a location closer to the seat than the front wheel; this location can be at the articulating member, more particularly at its body-member associated portion or its rear-legs associated portion or between these two portions; the footrest can be constituted by the above pedals, when detached from the front wheel.

The vehicle can have a steering mechanism of any design allowing the front bar lower portion to be pivoted between its operational and storage orientations. According to one example of such design, the steering mechanism can comprise the following elements:

a front rotation member fixedly mounted to the front bar;

a rear rotatable port located at the rear end of the body member and configured for fixedly receiving therein the rear steering handle so that rotation of the handle about the handle axis causes the port to rotate accordingly; and at least one pair of cable sections including a right cable section and a left cable section, each extending between the front rotation member and the port and being so connected thereto that rotation of the port in different directions causes it to pull the left or right section and such pulling yields the rotational movement of the front rotation member and subsequently at least a lower portion of the front bar, wherein the right and left cable sections are configured for bending at a location thereof disposed in the vicinity of the front pivot axis.

The right and left cable sections can extend along and within the body member of the vehicle along a majority of their length. The right and left cable sections can be parts of one cable fixedly attached to the front rotation member and to the rotation port.

In accordance with another aspect of the subject matter of the present application, the vehicle generally described in the first paragraph of the GENERAL DESCRIPTION section, can comprise:

a body member having an upper surface holding a seat, front and rear ends spaced from each other along the longitudinal axis, a right rear side surface and a left rear side surface both disposed adjacent the rear end of the body member and spaced from each other in a direction perpendicular to the plane of symmetry;

a front bar and a front wheel mounted thereto, the front bar being at least indirectly pivotally articulated to the body member adjacent its front end, to take operational and storage orientations;

a right rear leg and a left rear leg each having a leg proximal end and a leg distal end to which a rear wheel is mounted;

a right and a left rear pivot axis, about which the corresponding right or left rear leg is pivotally articulated to the respective rear side surface of the body member to take an operational and a storage orientation, each of the rear pivot axes being oriented at an acute angle to the plane of symmetry of the vehicle in its plan view so that the rear legs' pivoting about the rear pivot axes from their operational to their storage orientation allows their distal ends to get closer to the plane of symmetry, e.g., to become spaced from this plane to a lesser extent in their storage orientation than in their operational orientation, and, optionally, become spaced from this plane to the same or about the same extent as their proximal ends.

The vehicle in accordance with this aspect of the presently disclosed subject matter can have any of the features specified above with respect to the previously described aspect of the presently disclosed subject matter in any combination thereof.

In accordance with a further aspect of the subject matter of the present application, the vehicle generally described in the first paragraph of the GENERAL DESCRIPTION section, can comprise:

a body member comprising an upper surface holding a seat, front and rear ends spaced from each other along the longitudinal axis, a right rear side surface and a left rear side surface both disposed adjacent the rear end of the body member and spaced from each other in a direction perpendicular to the plane of symmetry;

a front bar and a front wheel mounted thereto, the front bar being at least indirectly pivotally articulated to the body member adjacent its front end to take operational and storage orientations;

a right rear leg and a left rear leg each having a leg proximal end and a leg distal end to which a rear wheel is mounted;

a right and a left rear pivot axis, about which the corresponding right or left rear leg is pivotally articulated to the respective rear side surface of the body member to take operational and storage orientations, each of the rear pivot axes being oriented at an acute angle with respect to the reference plane in the vehicle's rear view, so as to obtain an increased spacing between the rear legs' distal ends in their operational orientation relative to that, which the legs would have with the pivot axes lying in a plane parallel to the reference plane.

The vehicle in accordance with this aspect of the presently disclosed subject matter can have any of the features specified above with respect to the previously described aspects of the presently disclosed subject matter, in any combination thereof.

In accordance with yet another aspect of the subject matter of the present application matter, the vehicle generally described in the first paragraph of the GENERAL DESCRIPTION section, can comprise:

a body member having a front portion and a rear portion;

a front bar pivotally articulated at least indirectly to the front portion of the body via a front pivot axis and holding a front wheel of the vehicle, so as to be pivoted between its operational orientation and storage orientations;

two rear legs each pivotally articulated to the rear portion of the body via a rear pivot axis to take operational and storage orientations, and holding a rear wheel of the vehicle;

a rotatable rear steering port configured to fixedly receive therein a rear steering handle for using said handle when the vehicle is in its operational state;

a steering mechanism connecting said port with the front bar so that rotation of the port by the handle causes at least a lower portion of the front bar to rotate for steering the vehicle when in its operational state, the steering mechanism comprising at least one steering element extending at least partially within the body member and configured to be bent in the vicinity of the front pivot axis, when the front bar is pivoted from its operational orientation to its storage orientation.

The steering mechanism can further comprise a front rotation member fixedly mounted to the front bar, and a pair of bendable right and left cable sections constituting the steering elements, each extending between the front rotation member and the port and so connected thereto that rotation of the port clockwise or counterclockwise causes the port to pull the respective right or left section, and such pulling yields the rotational movement of the front rotation member and subsequently of the front bar. The right and left cable sections can extend along a majority of their length within the body member and are each configured to be bent in the vicinity of the front pivot axis.

The vehicle in accordance with this aspect of the presently disclosed subject matter can have any of the features specified above with respect to the previously described aspects of the presently disclosed subject matter, in any combination thereof.

According to a still further aspect of the presently disclosed subject matter, the vehicle generally described in the first paragraph of the GENERAL DESCRIPTION section, can be convertible into a stroller configured for preventing the child, when desired, from being able to steer the vehicle, the vehicle comprising a body member having a front portion and a rear portion;

a front bar pivotally articulated at least indirectly to the front portion of the body via a front pivot axis so as to be pivoted between its operational orientation and storage orientations, and holding a front wheel of the vehicle to which a pair of pedals can be or are mounted;

two rear legs each pivotally articulated to the rear portion of the body via a rear pivot axis to take operational and storage orientations, and holding a rear wheel of the vehicle;

the vehicle further having any one, any two, any three or all of the following features:

a non-integral design of the front bar, whose upper and lower portions can be locked to each other to behave as a single integral unit steerable by operating the handlebars, and unlocked from each other allowing the lower portion to be steered by a separate steering mechanism not including the upper portion, and allowing a desired functionality of the upper portion without having any influence on the steering of the lower portion;

a front bar locking clamp for locking at least an upper portion of the front bar to an element of the vehicle, such as e.g., its securing frame, which is not movable when in the operational state of the vehicle, to prevent the possibility of rotating the front bar or its upper portion about the front bar axis by operating its handlebars;

a foldable rear steering mechanism for use with a rotatable rear steering handle when mounted to the rear end of the body member, the mechanism connecting the handle with the front bar so that manipulation of the handle causes at least a lower portion of the front bar to rotate about the front bar axis for steering the vehicle; and a footrest fixedly mountable at least indirectly to the body member at a location closer to the seat than the front wheel; this location can be at the articulating member, more particularly at its body-member associated portion or its rear-legs associated portion or between these two portions; the footrest can be constituted by pedals, when detached from the front wheel.

The vehicle in accordance with this aspect of the presently disclosed subject matter can have any of the features specified above with respect to the previously described aspects of the presently disclosed subject matter, in any combination thereof.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 2A:
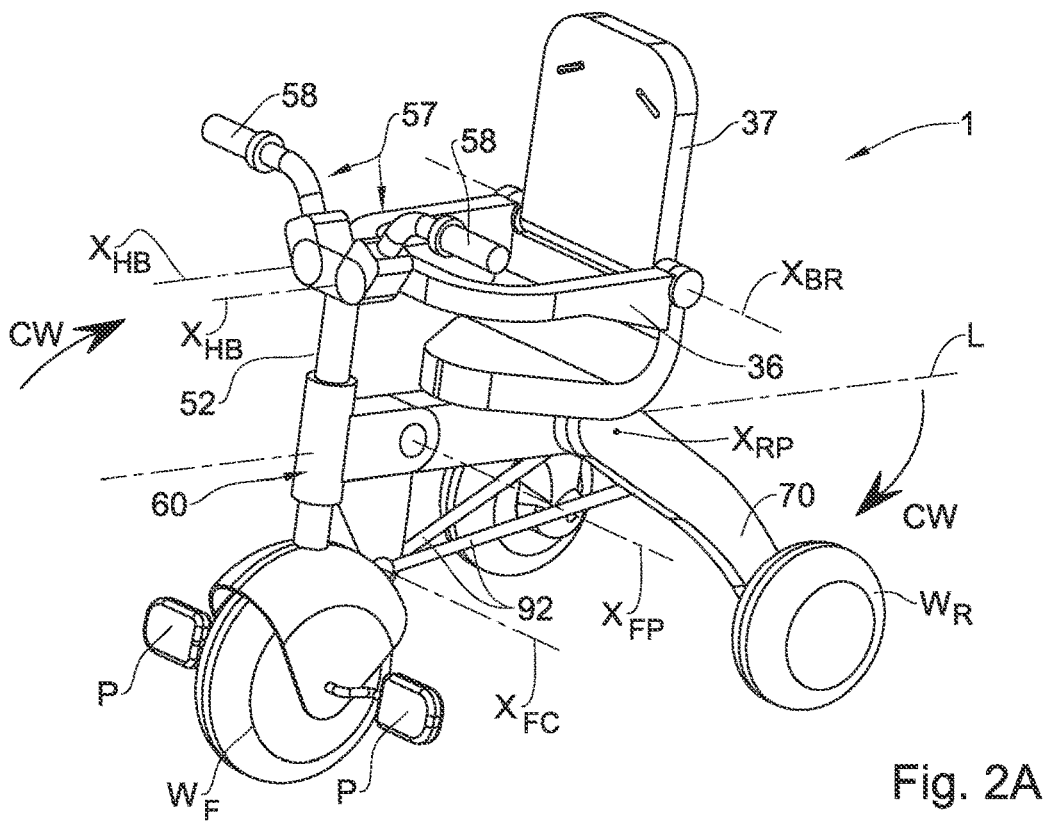
FIGS. 2A to 2E schematically illustrate the process of folding a tricycle as shown in FIGS. 1A to 1E for bringing it from the operational state shown in FIG. 2A into its storage state shown in FIG. 2E.
Figure 2B:
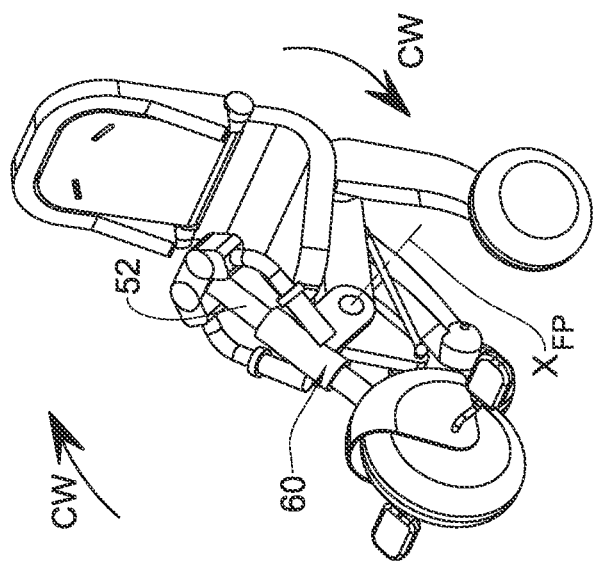
Figure 2C:
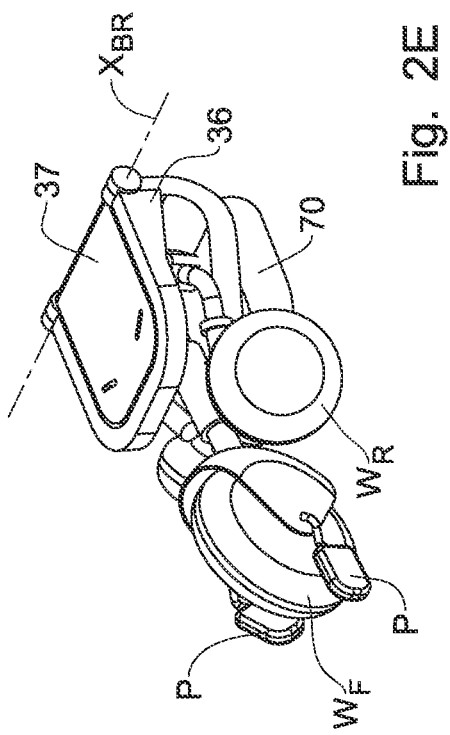
Figure 2D:
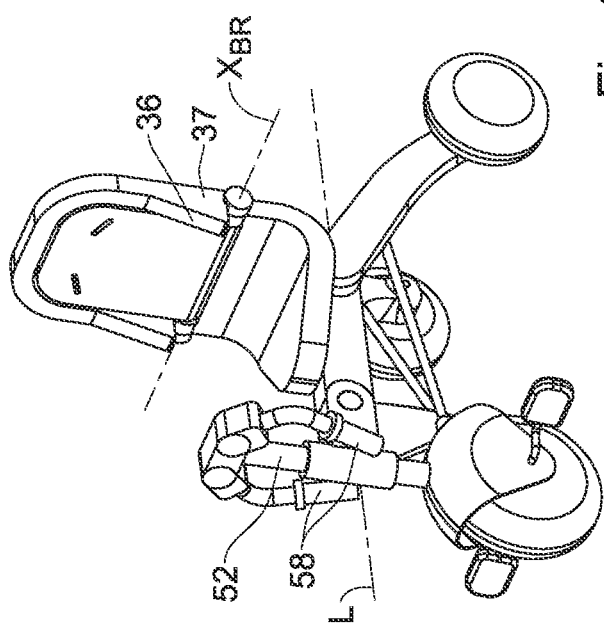
Figure 2E:
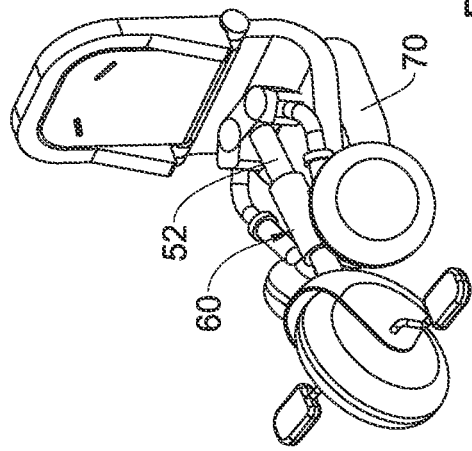
Figure 3A:
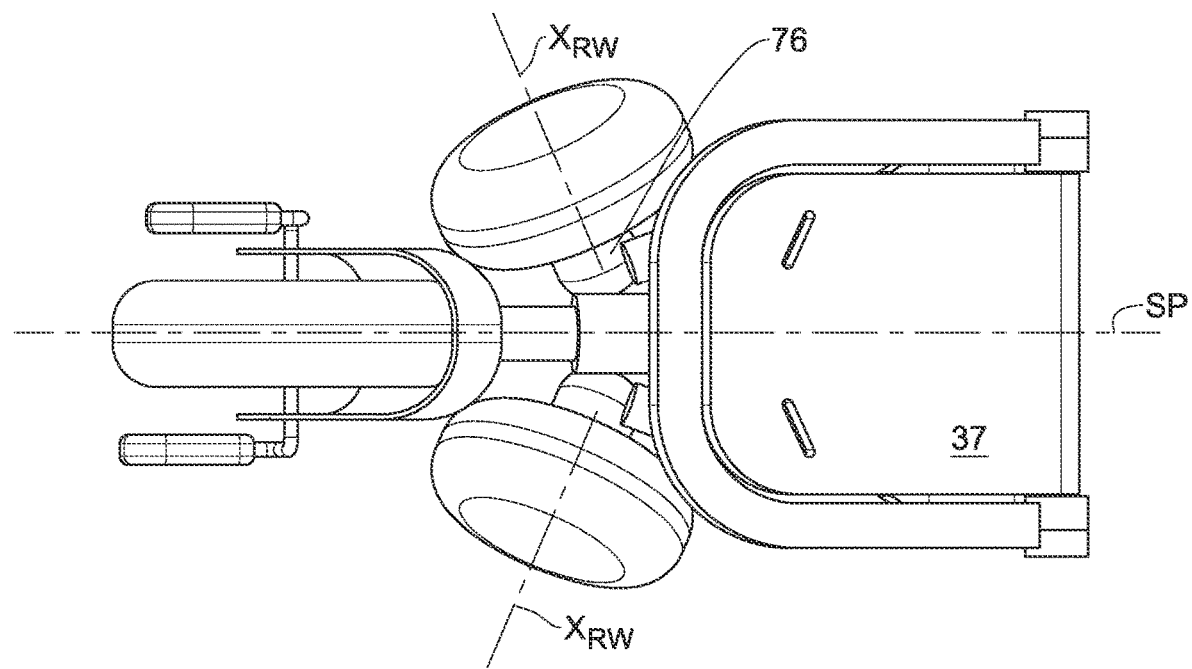
FIG. 3A is a schematic plan view of the tricycle shown in FIG. 2E.
Figure 3B:
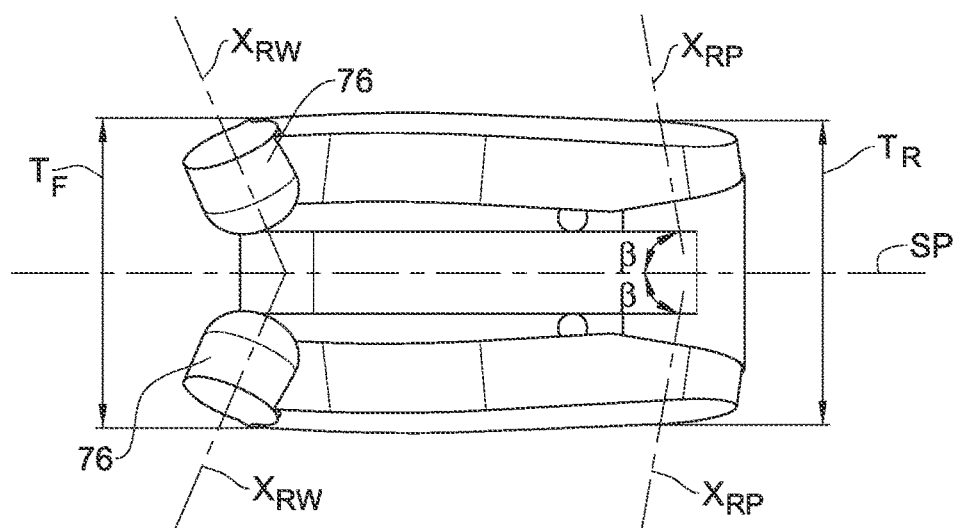
FIG. 3B is a schematic plan view of the a body member and rear legs of the tricycle shown in FIG. 3A.
Figure 3C:
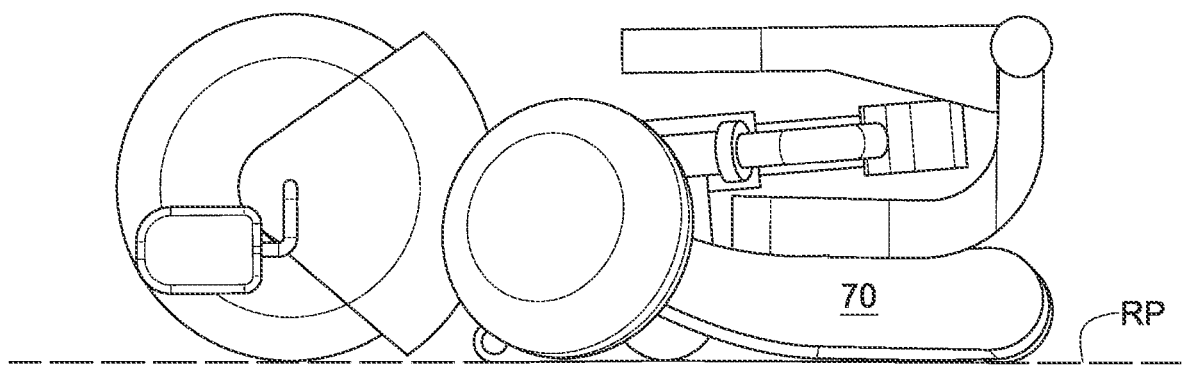
FIG. 3C is a schematic side view of the tricycle shown in FIG. 2E.
Figure 3D:
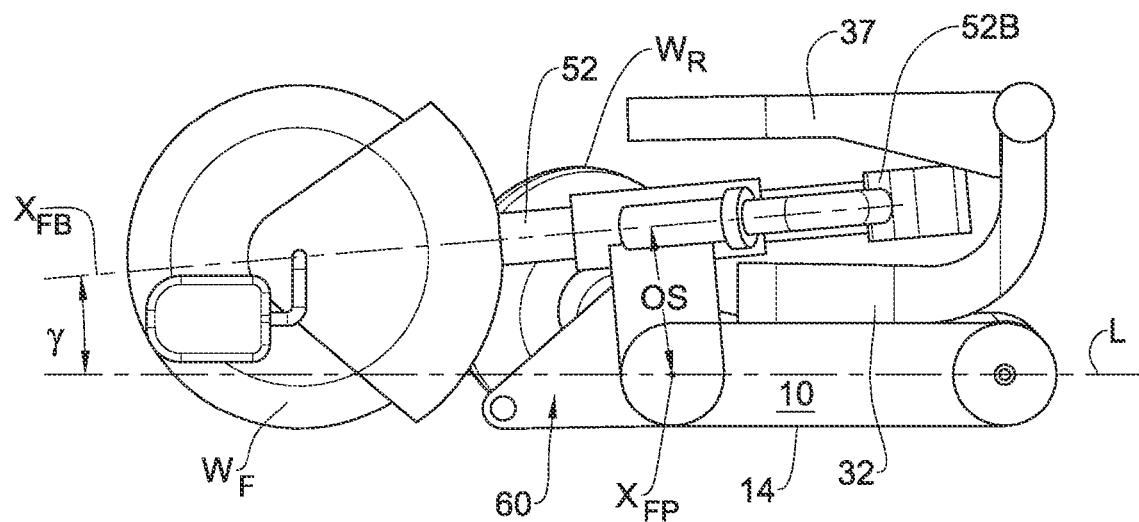
FIG. 3D is the same view of the tricycle as shown in FIG. 3C, but without its right rear leg and wheel.
Figure 3E:
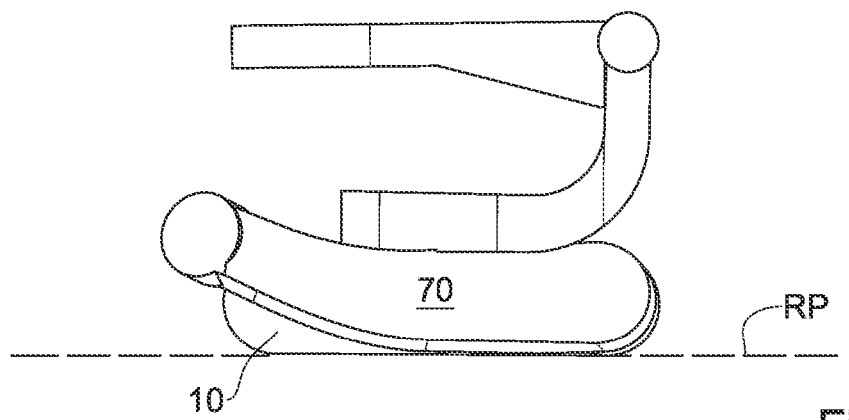
FIG. 3E is the same view of the tricycle as shown in FIG. 3C, but without its front assembly and its rear wheels.
Figure 4B:
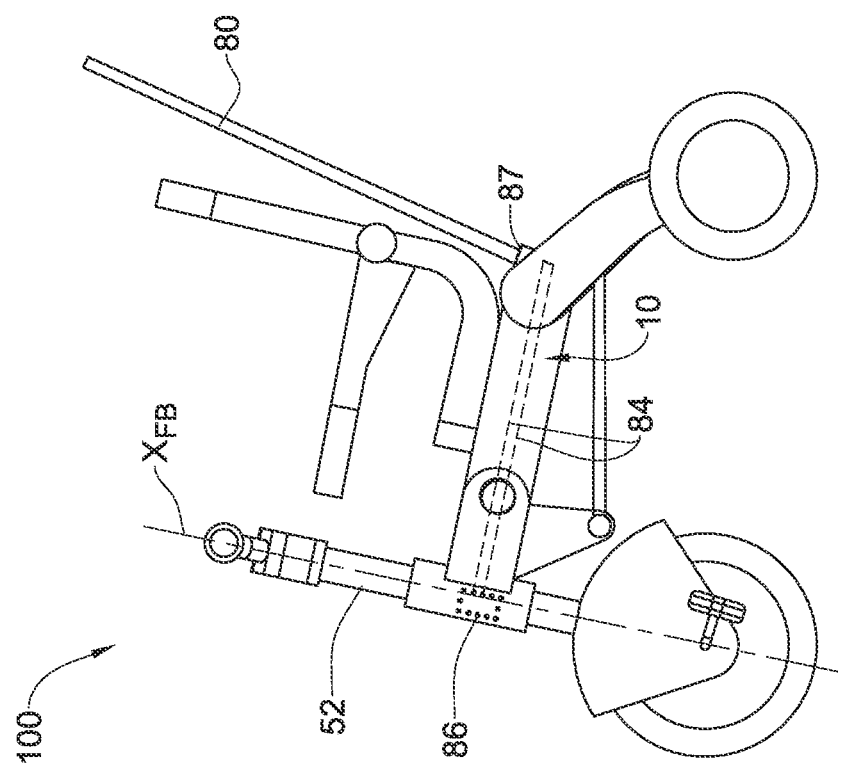
FIGS. 4A and 4B are perspective and side views, respectively, of a foldable tricycle according to another embodiment of the presently disclosed subject matter.
Figure 4A:
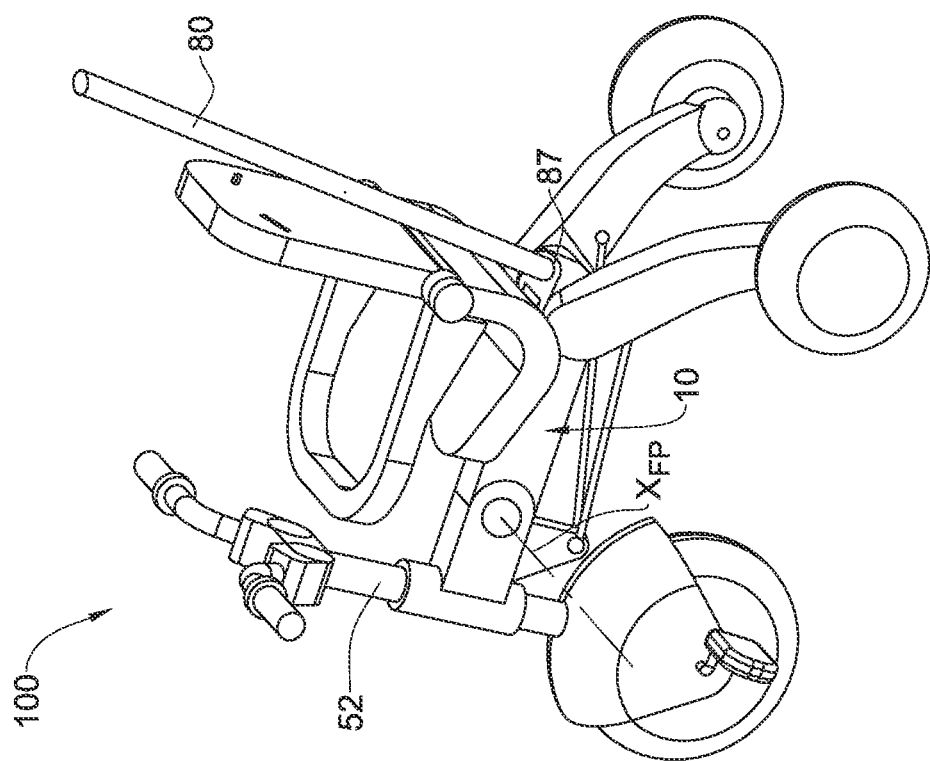
Figure 5A:
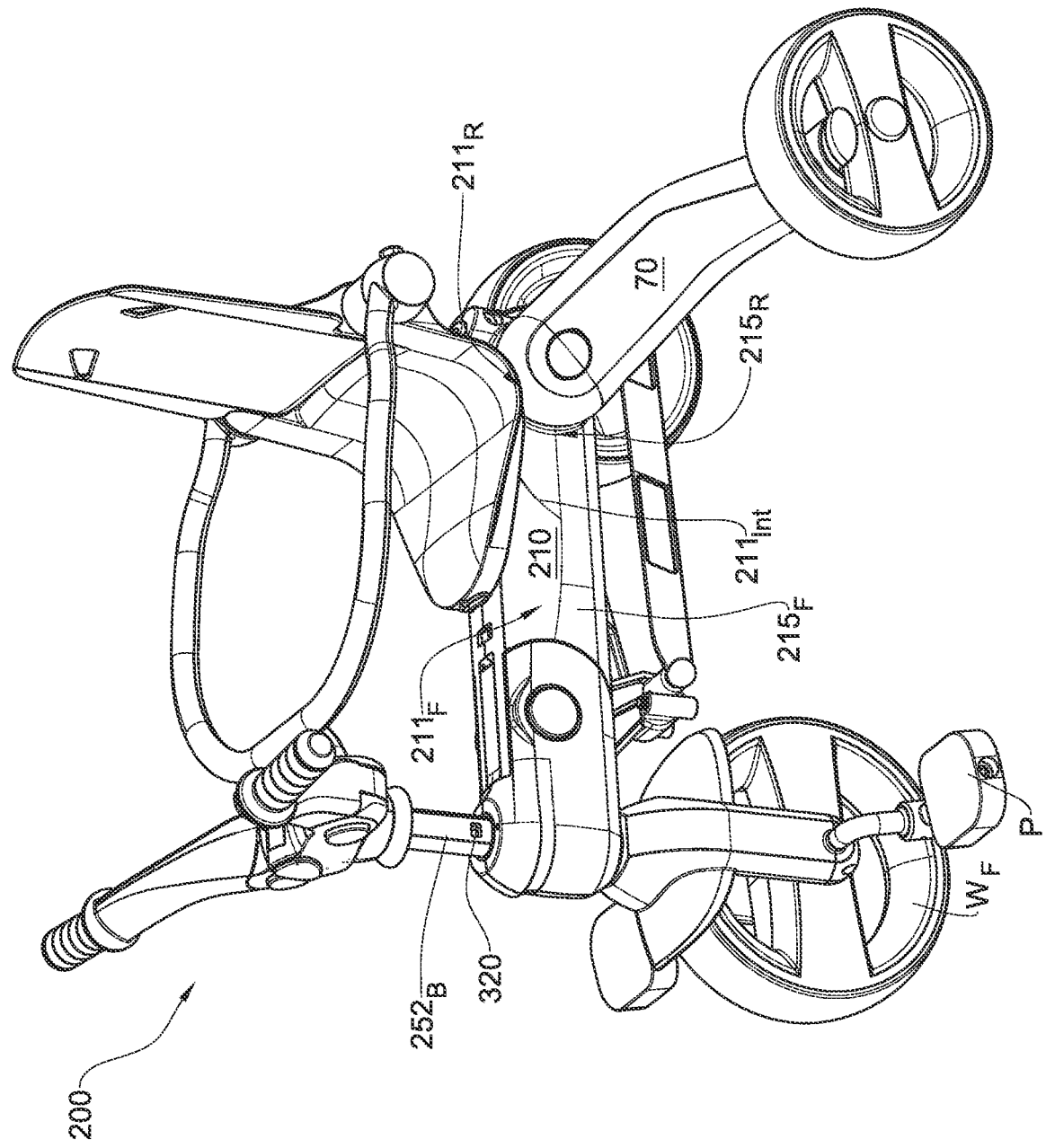
FIGS. 5A and 5B are respective perspective and partially exploded schematic views of a foldable tricycle according to a still further embodiment of the presently disclosed subject matter.
Figure 5B:
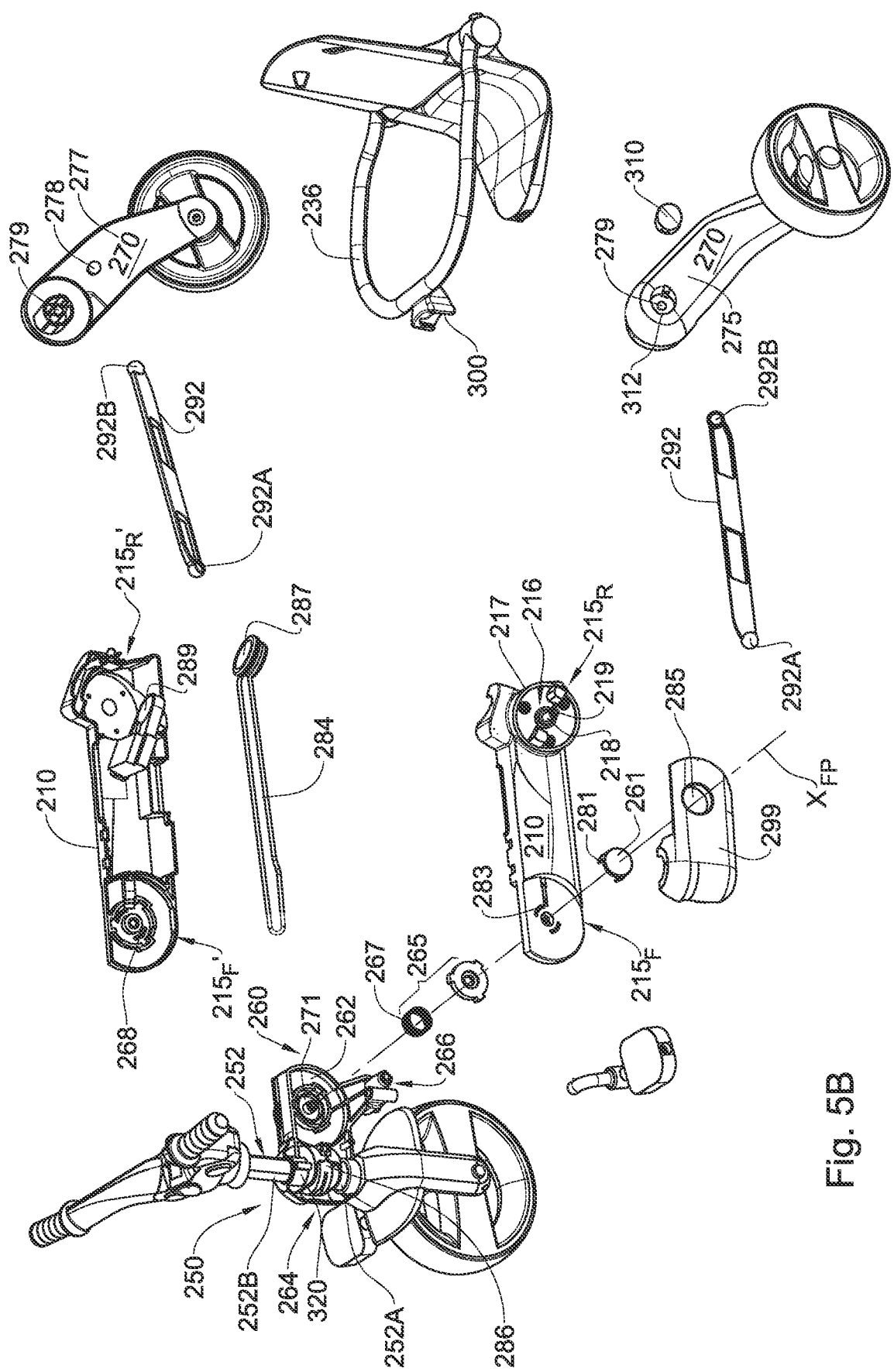
Figure 5C:
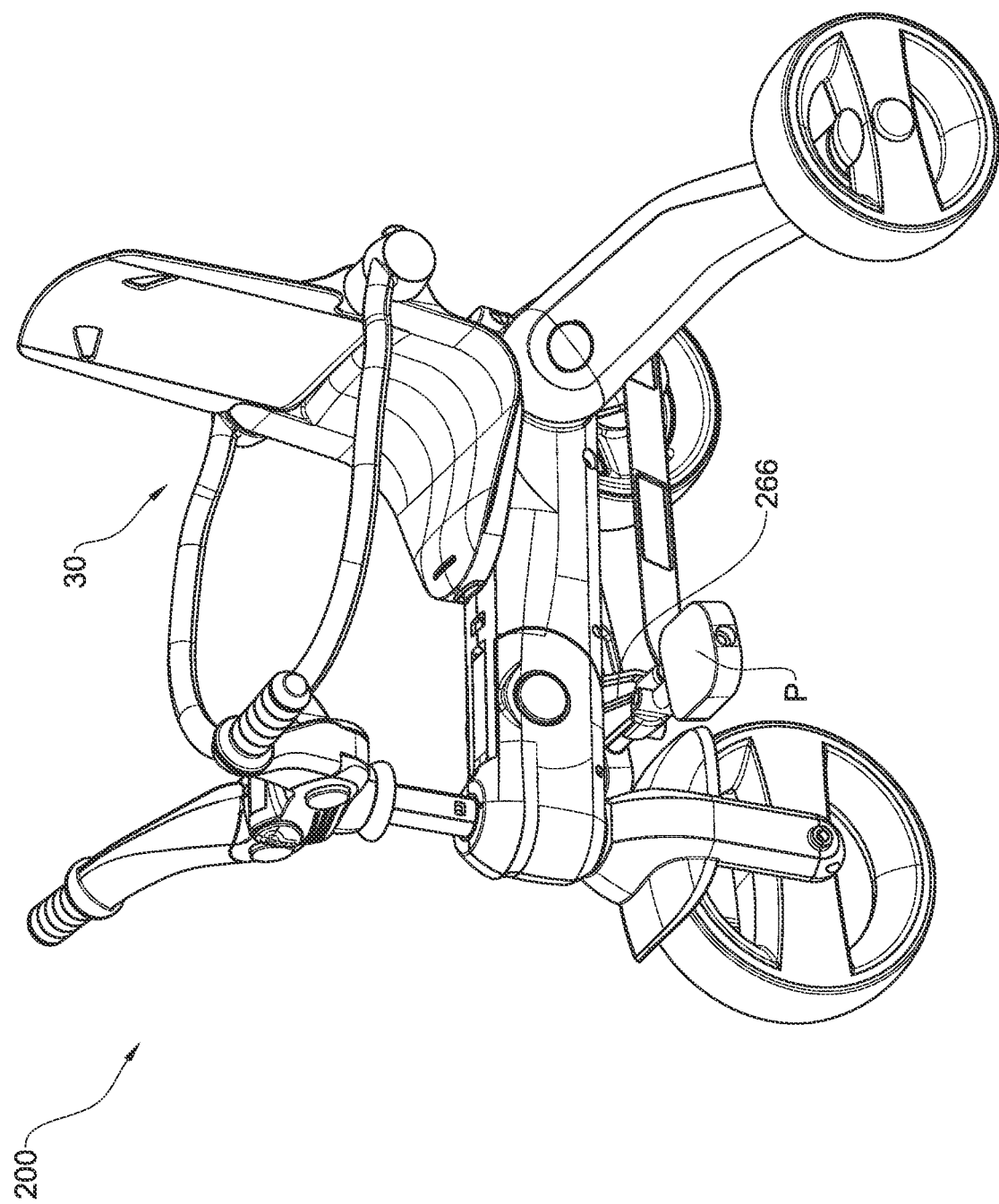
FIG. 5C is a perspective view of the tricycle shown in FIG. 5A with its pedals constituting a footrest.

The drawings listed above illustrate a number of tricycles for kids, each referred to throughout the specification as a 'vehicle', including a vehicle 1 illustrated in FIGS. 1A to 3E, a vehicle 100 illustrated in FIGS. 4A and 4B and vehicle 200 illustrated in FIGS. 5A to 5C. Each of the vehicles 1, 100 and 200 has a longitudinal axis L lying in a symmetry plane SP of the vehicle, and is foldable between its operational state, in which the vehicle can be ridden along a plane perpendicular to the plane of symmetry and referred to in the present specification as a reference plane RP, and storage state, in which the vehicle can be freely laid on the reference plane RP so that its longitudinal axis L forms an angle LR with that plane, not exceeding or at least not essentially exceeding that formed between them in the operational state of the vehicle.

The longitudinal axis, the plane of symmetry, the reference plane and the storage state of the vehicle are shown in the drawings only with respect to the vehicle 1, the description of the vehicle 1 being fully applicable to the vehicles 100 and 200.

Figure 1B:
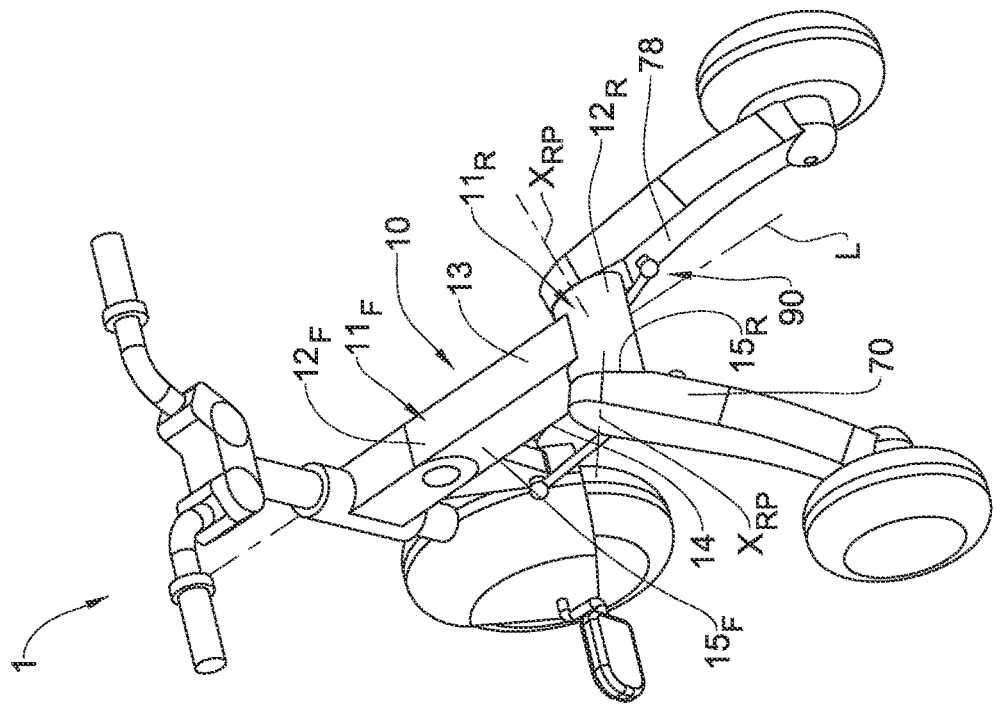
FIG. 1B is another schematic perspective view of the tricycle shown in FIG. 1A, with its seat arrangement being removed.
Figure 1A:
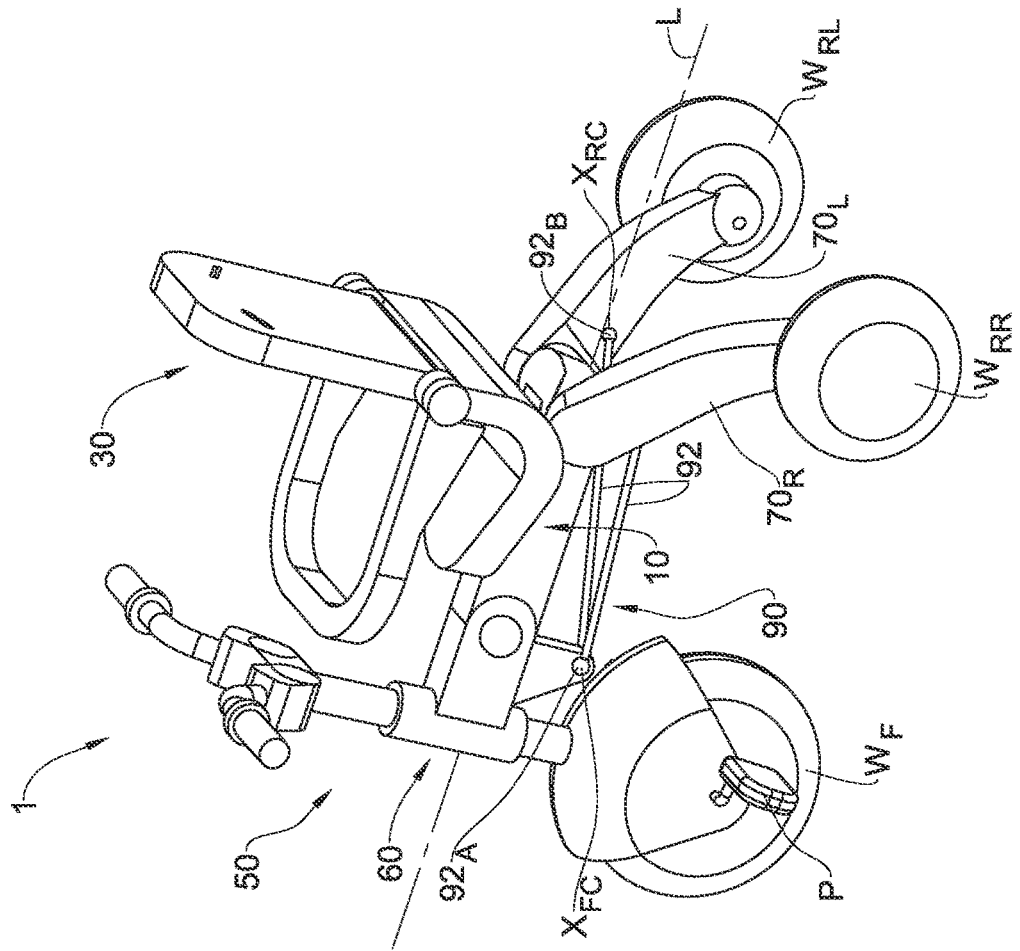
FIG. 1A is schematic perspective view of a foldable tricycle in accordance with one embodiment of the subject matter of the present application, shown in an operational state thereof.

Referring to FIG. 1A, the vehicle 1 comprises a rigid body member 10, a seat arrangement 30, a front assembly 50 with a front wheel $W_F$ having pedals P, right and left rear legs $70_R$ and $70_L$ with respective rear wheels $W_{RR}$ and $W_{RL}$, and a connection mechanism 90. Since the rear legs and their rear wheels have identical design, they are designated in Figures other than FIG. 1A by a single reference numeral 70 and their wheels are designated hereinafter as $W_R$.

Figure 1D:
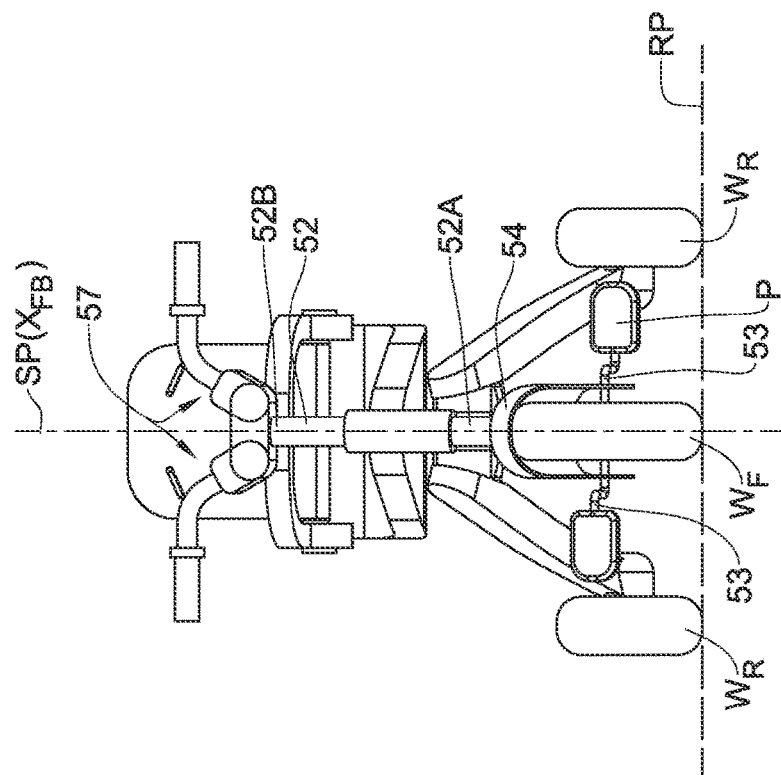
FIGS. 1C and 1D are respective schematic side and front views of the tricycle shown in FIG. 1A.
Figure 1C:
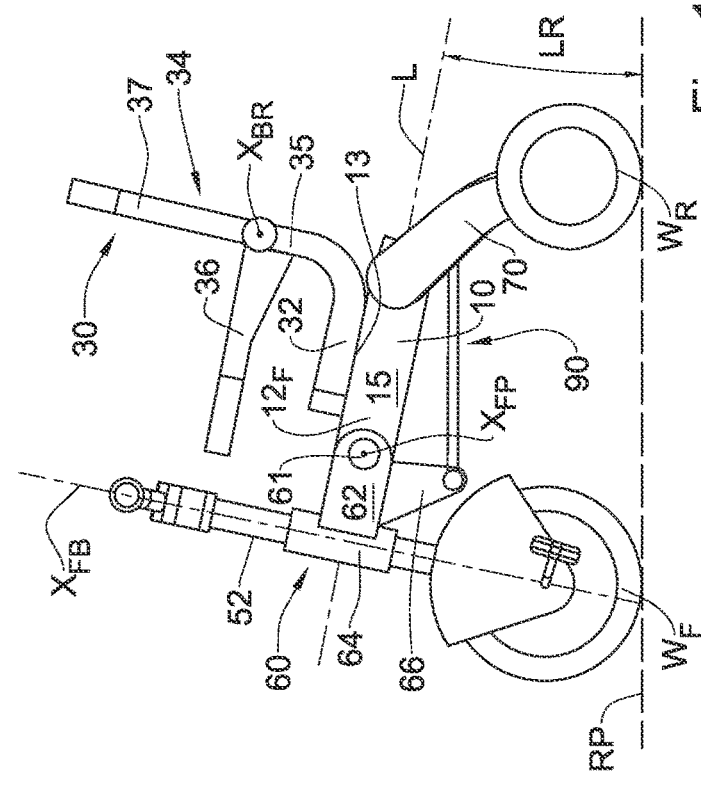
Figure 1E:
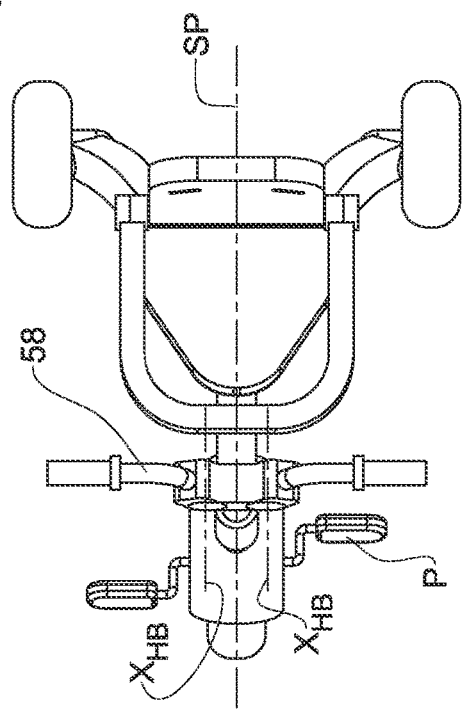
FIGS. 1E and 1F are respective schematic plan and rear views of the tricycle shown in FIGS. 1A to 1E.
Figure 1F:
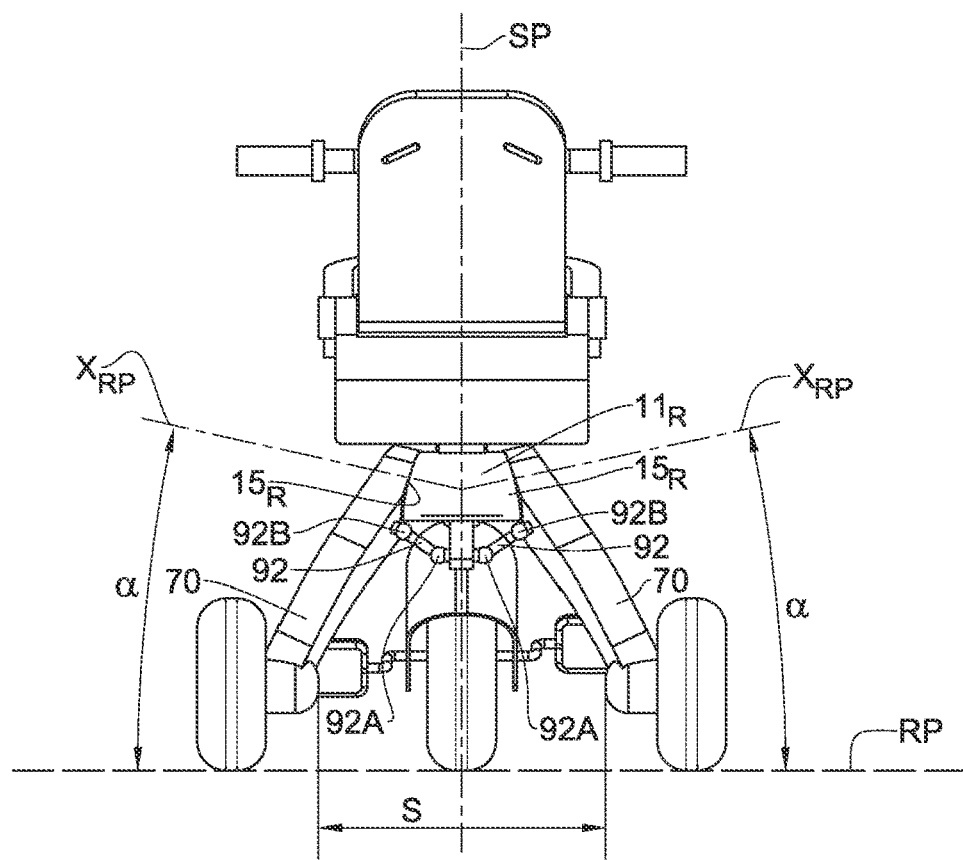
Figure 1G:
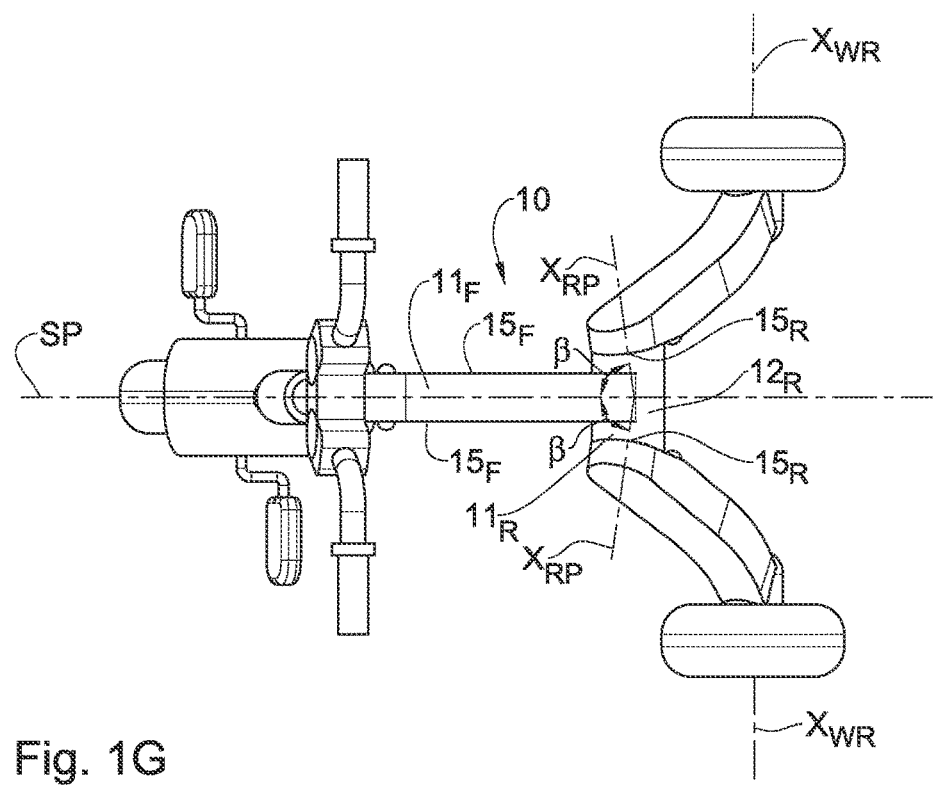
FIG. 1G is the same plan view of the tricycle as in FIG. 1E but without its seat and securing frame.

Referring to FIGS. 1B and 1G, the body member 10 comprises a front body portion $11_F$ including a front body end $12_F$ and a rear body portion $11_R$ including a rear body end $12_R$, the front and rear portions having fixed mutual disposition in both operational and storage state of the vehicle. The body member can be in the form of a unitary body or rather it can be assembled of a number of elements.

As seen in FIG. 1B, the body member 10 comprises an upper surface 13 facing upwardly or away from the reference plane RP, a lower surface 14 facing downwardly or towards the reference plane RP, right and left front side surfaces $15_F$ extending between front portions of the upper and lower surfaces of the body member and defining the front body portion $11_F$, and right and left rear side surfaces $15_R$ extending between rear portions of the upper and lower surfaces of the body member and defining the rear body portion $11_R$, to which the rear legs 70 are pivotally articulated. As best seen in FIG. 1G, the right and left front side surfaces $15_F$ of the body member 10 are closer to the plane of symmetry SP than the rear right and left side surfaces $15_R$, meaning that the rear body portion $11_R$ is wider than the front body portion $11_F$ in the direction perpendicular to the plane of symmetry SP.

As best seen in FIGS. 1A and 1C, the seat arrangement 30 comprises a seat 32, which is mounted to the upper surface 13 of the body member 10 so as to be supported at least partially by the rear body portion $11_R$. The seat arrangement can be configured for being mounted at one of at least two different positions along the body member, with different extent, to which the upper surface of the rear body portion $11_R$ is covered by the seat's area.

The seat arrangement 30 further comprises a backrest 34 having a stationary backrest portion 35 integrally assembled or unitarily formed with the seat 32, and a foldable backrest portion 37. The backrest portion 37 is pivotable about an axis $X_{BR}$, which is parallel to the reference plane RP and is spaced from the seat 32 by the stationary seat portion 35, between a generally upright orientation of the backrest portion 37 in the operational state of the vehicle 1 and generally horizontal orientation of the backrest portion 37 in the storage state of the vehicle. In addition, the backrest portion can be configured to take at least two different upright positions to allow choosing a more convenient support to the back of a rider/user in the operational state of the vehicle.

The seat arrangement 30 further comprises an optional securing frame 36, which in the present example can be pivotal about the same axis $X_{BR}$ as the pivotal backrest portion 37 between its generally horizontal operational orientation, in which it can prevent a child seated in the seat 32 from falling off the vehicle 1 and a generally vertical non-operational orientation used in the process of folding the vehicle. The securing frame can be configured for being detachably attachable to the vehicle.

The seat can be formed without the stationary portion and/or the securing frame, and the foldable backrest portion can have different axes, about which they can be pivoted, with the pivotal axis of the backrest being disposed closer to the seat than that of the securing frame in the operational state of the vehicle. The backrest can be made of a rigid material or it can be in the form of a fabric casing configured to be dressed on a backrest frame (not shown), which can be permanently pivotally mounted to the seat, or can be detachably attachable to the seat, when needed to bring the vehicle into its operational state.

The shape of the rear body portion $11_R$ and manner, in which the rear legs 70 are pivotally articulated thereto, will now be described in more detail with reference to FIGS. 1B, 1F, 1G and 1H.

The rear body portion $11_R$ has a converging configuration as seen in its plan view (FIG. 1G) and rear view (FIG. 1F), due to the corresponding orientation of the right and left rear side surfaces $15_R$. More particularly, these surfaces $15_R$ are so inclined as to become closer to each other in the direction away from the rear body end $12_R$ (FIG. 1G) and in the direction away from the reference plane RP (FIG. 1F).

Figure 1H:
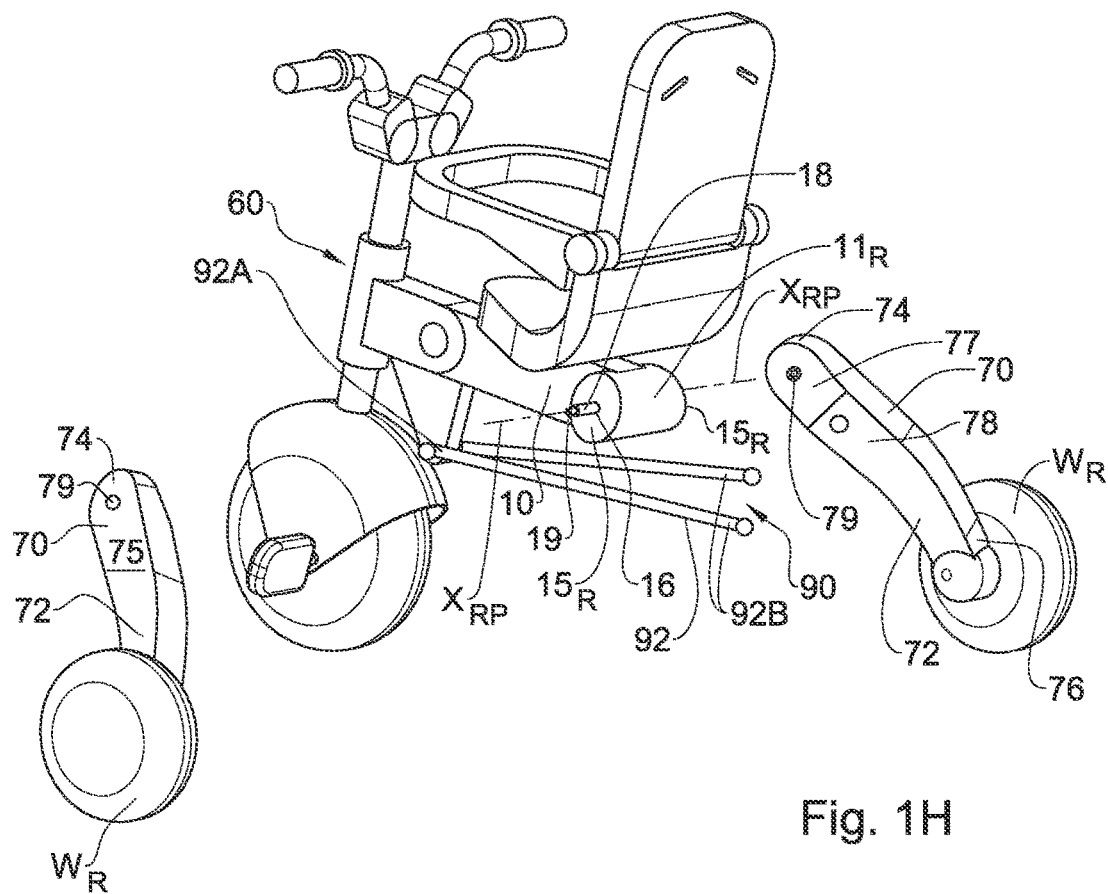
FIG. 1H is the same perspective view of the tricycle as in FIG. 1B, with its rear legs being dissembled.

Referring to FIG. 1H, the rear side surfaces $15_R$ of the body member 10 are each provided with an articulation axle 16 fixedly mounted to the rear body portion $11_R$ (only the right axle being seen) so that its outer portion 18 with its free end 19 protrudes from the rear side surface for holding thereon the corresponding rear leg 70. Each outer portion 18 of the articulation axle 16 extends along a corresponding pivot axis $X_{RP}$ oriented perpendicularly to the associated rear side surface $15_R$ and intersecting this surface at a rear articulation point PRA (only one such point being seen). The rear articulation points PRA of the two, right and left, rear side surfaces $15_R$ can be located so that an imaginary line connecting them intersects the longitudinal axis L of the vehicle (not shown).

The rear side surfaces $15_R$ are oriented so that the rear axes $X_{RP}$, which are perpendicular thereto, form desired angles with the reference plane RP. More particularly, as seen in FIG. 1F, the rear pivot axes $X_{RP}$ each form an acute angle $\alpha$ with the reference plane RP. This allows obtaining an increased spacing S between the rear legs' distal ends in their operational orientation, relative to that which the same legs would have with their pivot axes $X_{RP}$ lying in the plane parallel to the reference plane RP. In addition, as seen in FIG. 1G, each pivot axis $X_{RP}$ is oriented at an acute angle $\beta$ with respect to the plane of symmetry SP of the vehicle. This ensures that the rear legs' pivoting about the rear pivot axes $X_{RP}$ from the operational to the storage orientation results in their distal ends to get closer to the plane of symmetry so as to become spaced from this plane to the same or about the same extent as their proximal ends, despite the above increased spacing. Moreover, in fact, due to the above angle β the distal ends of the rear legs in the storage orientation of the legs can even get closer to each other than their proximal ends, thereby improving the 'storage state' compactness of the vehicle in the direction perpendicular to the plane of symmetry, as explained in more detail below with reference to FIGS. 3A and 3B.

Referring to FIGS. 1B, 1G and 1H, each of the rear legs 70 has an elongated body 72 with a proximal end 74, a distal end 76 carrying the rear wheel $W_R$, and a connection area 78 (only one seen in FIGS. 1B and 1H) between the leg proximal end and the leg distal end, associated with the connection mechanism 90 (better seen in FIG. 1A). Each rear leg 70 further comprises a rear leg outer surface 75 facing away from the body member and a rear leg inner surface 77 facing in the direction of the body member and comprising the connection area 78.

Each of the rear legs 70 is formed, adjacent its proximal end, with a through channel 79, which extends between inner and outer side surfaces 77 and 75 of the rear leg and is configured to receive therein from the inner side surface of the leg the outer portion 18 of the articulation axle 16 and from the outer side surface a stopper (not shown) configured to fixedly engage the free end 19 of the axle 16 so as to allow pivoting of the leg about the axle while preventing the leg from being dissembled from the axle.

Each rear leg inner surface 77 at the proximal end of the leg is oriented in the same manner as, and is coextensive with, the corresponding rear side surface $15_R$ of the body member 10 so that these surfaces can be in intimate contact with each other in both storage and operational states of the vehicle.

In the operational state of the vehicle, the legs 70 have an operational orientation, in which the rear wheels $W_R$ are disposed at a maximal distance from the front wheel $W_F$ along the plane RP. The rear wheels $W_R$ have their wheel axes $X_{WR}$ that are collinear with one another in the operational orientation of the rear legs 70, allowing the two rear wheels $W_R$ to travel functionally together being parallel to each other in the state of the vehicle 1.

Referring to FIG. 1D, the front assembly 50 comprises a front bar 52 extending along a front bar axis $X_{FB}$ lying in the plane of symmetry SP, and having a wheel end 52A associated with the front wheel $W_F$ and a handlebar end 52B associated with handlebars 57. The front bar 52 with its handlebars 57 can be configured for being revolved about the front bar axis $X_{FB}$ for steering the vehicle 1. In the operational orientation of the front bar 52, its handlebar end 52B is disposed at a maximal distance from the reference plane RP.

Referring to FIG. 1E, the handlebars 57 in their operational orientation have handle portions 58 extending generally transversely to the plane of symmetry SP of the vehicle so that their ends are spaced from the front bar 52 and from the plane SP to a maximal extent, and they are each rotatable about a handle bar axis $X_{HB}$, which extends generally parallel to the plane SP so that in the storage orientation of the handle portions 58 their ends can be spaced from the plane of symmetry SP to a minimal extent.

The wheel end 52A of the front bar 52 is formed with a fork 54 rotatably holding the front wheel $W_F$. The pedals P are each held by a corresponding pedal axle 53 mounted to the front wheel through an opening in the fork 54, via which it passes freely. Each pedal can be configured to revolve between an operational orientation, in which it is oriented transversely to its axle 53, and a storage orientation in which it is aligned with this axle. The pedals with their axles can be detachable from the front wheel.

Referring to FIG. 1C, the front assembly 50 further comprises an articulating member 60 for pivotal articulation of the front bar 52 to the front end $12_F$ of the body member 10 about a front pivot axis $X_{FP}$, which is perpendicular to the plane of symmetry SP (and parallel to the reference plane RP) and which meets each side 15 of the front portion of the body member 10 at a front articulation point $P_F$. The front pivot axis $X_{FP}$ crosses the longitudinal axis L of the vehicle.

The articulating member 60 comprises a body-member associated portion 62, which is pivotally connected to the front portion of the body member about the front pivot axis $X_{FP}$, a front-bar associated portion 64 connected to the front bar 52 along a section thereof disposed between the two ends of the front bar, and a rear-legs associated portion 66 constituting a part of the connection mechanism 90. The front-bar associated portion 64 and the rear-legs associated portion 66 are formed so that, in an operational orientation of the articulating member 60, the front-bar associated portion 64 is disposed in front of the body-member associated portion 62, and the rear-legs associated portion 66 is disposed closer to the reference plane RP than the body-member associated portion 62. In the described example, where the front bar 52 is configured for revolving about the front bar axis $X_{FB}$, the front-bar associated portion 64 is in the form of a sleeve receiving therein the front bar 52 in a manner allowing its revolution within the sleeve.

The articulating member 60 can be provided with a locking arrangement comprising a button 61, ensuring that the articulating member 60 is locked to the body member 10 at least in the operational state of the vehicle and is unlocked therefrom by pressing the button 61 only when it is desired to change the state of the vehicle and pivot the articulating member 60 about the front pivot axis $X_{FP}$.

Referring to FIGS. 1A, 1F and 1H, the articulating member 60 connects the front bar 52 with the connection areas 78 of the legs 70 by means of two longitudinal connection elements or bars 92, each having a front connection end 92A attached to one side of the rear-legs associated portion 66 of the articulating member 60 so as to enable pivoting of the connection element 92 with respect to the rear-legs associated portion 66 about a front connection axis $X_{FC}$, and a rear connection end 92B attached to the connection area 78 of one of the legs 70 so as to enable pivoting the connection element 92 with respect to the rear leg 70 about a rear connection axis $X_{RC}$. The connection elements 92 are made of a rigid material so that their dimensions are maintained unchanged during their operation.

Reference is now made to FIGS. 2A to 2E, illustrating the process of folding the vehicle 1 in order to bring it from its operational state shown in FIGS. 1A to 1F and also in FIG. 2A, to its storage state shown in FIGS. 2E, 3A and 3C. The vehicle is shown in FIGS. 1A to 1F and 2A in its operational state, in which it can be ridden along a plane, i.e. reference plane RP (shown in FIG. 1F), and in FIGS. 2E, 3A and 3B in its storage state, in which it can be freely laid on such plane so that its longitudinal axis forms an angle with that plane, which does not exceed that formed between them in the operational state. This process is described below with reference to the axes, about which elements of the vehicle 1 are to be pivoted/revolved when bringing them from their operational into their storage orientation, and with reference to FIG. 2A, these axes are as follows:

the handlebars axes $X_{HB}$, about which the handlebars 57 are rotated from their operational orientation shown in FIG. 2A, in which the handle portions 58 of the handlebars are disposed at their maximal distance from the front bar 52 and from the plane of symmetry SP, into their storage orientation shown in FIG. 2B, in which the handle portions 58 of the handlebars are disposed at their minimal distance from the front bar 52 and from the plane of symmetry SP;

the backrest axis $X_{BR}$, about which
 (a) the securing frame 36 is rotated between its operational orientation shown in FIG. 2A, which also constitutes its storage orientation shown in FIG. 2E and in which it forms with the reference plane RP a minimal angle, and its upright orientation shown in FIG. 2B, in which it forms with the reference plane RP a maximal angle; and
 (b) the backrest portion 37 is rotated from its operational, generally vertical, orientation shown in FIG. 2A, in which this portion forms with the reference plane a maximal angle, into its storage, generally horizontal orientation shown in FIG. 2E, in which it forms with the reference plane a minimal angle;

the front pivot axis $X_{FB}$, about which the front bar 52 is pivoted by the articulating member 60 clockwise (CW) between its operational orientation shown in FIG. 2A, in which it forms a maximal angle with the longitudinal axis L and with the reference plane RP, into its storage orientation shown in FIG. 2D, in which it forms a minimal angle with the longitudinal axis L and with the reference plane RP; FIG. 2C shows an intermediate orientation of the front bar 52 taken by it during the above pivoting movement prior to its reaching the storage orientation;

the rear pivot axes $X_{RP}$ (of which only one such axis is seen), about which the rear legs 70 are pivoted, when pulled by the articulating member 60 via the corresponding connection elements 92, from the operational orientation of the rear legs shown in FIG. 2A, in which the rear wheels are spaced to a maximal extent from the front wheel $W_F$, into the storage orientation of the leg shown in FIG. 2E, in which the rear wheels $W_R$ are spaced to a minimal extent from the front wheel $W_F$; since the front bar 52 and the rear legs 70 are connected to one another by the connection mechanism 90, the CW revolution of the front bar about the front pivot axis $X_{FP}$ entails a similar CW revolution of each of the rear legs about their respective axes $X_{RP}$;

the front connection axis $X_{FC}$, about which each connection element 92 is pivoted relative to the articulating member 60; and the rear connection axis $X_{RC}$ (not seen in FIGS. 2A to 2E), about which each connection element 92 is pivoted relative to the rear leg 70, when the front bar and the rear legs are pivoted as described above.

Thus, when the vehicle 1 is folded from its operational state into its storage state, first its handlebars are brought into their storage orientation and the securing frame is brought into its upright orientation as shown in FIG. 2B, then the front bar and the rear legs are pivoted into their storage orientation, as shown in FIGS. 2C and 2D; then the backrest is pivoted into its storage orientation and, simultaneously or subsequently, the securing frame is pivoted into its horizontal orientation, as shown in FIG. 2E. In addition, the pedals P are folded in order to conserve space in the folded state of the vehicle. The vehicle can then be returned into its operational state by performing the above steps in the reversed order.

Referring to FIG. 3B, owing to the angle 2β between the rear pivot axes $X_{RP}$, revolution of the legs 70 about these axes brings their distal ends 76 closer to the plane of symmetry SP than their proximal ends, allowing a compact configuration of the vehicle 1 in the storage state thereof such that its lateral extension $T_F$ at the area of the front end of the body member cannot exceed or at least not essentially exceed its lateral extension $T_R$ at the area of the rear end of the body member (FIG. 3A). It is also appreciated that in the storage state of the vehicle 1, the rear wheel axes $X_{WR}$ become angled to one another as clearly seen in FIG. 3A.

Referring to FIGS. 3A and 3E, owing to the fact that each of the rear legs is individually articulated to the corresponding side of the rear portion of the body member, the angle of pivoting of the legs from their operational to their storage orientation, is so large that in its storage orientation each rear leg has its distal end close to the front end of the body member and it does not protrude essentially frontward from this end. Consequently, as seen in FIG. 3C, in the storage state of the vehicle as seen in its side view, each rear leg and the associated rear wheel are accommodated mainly between the body member's rear end and the front wheel, allowing thereby reducing the length of the vehicle in this state along the reference plane.

Furthermore, referring to FIG. 3E, each rear leg 70 has such shape and width relative to those of the body member 10 that, in the storage state of the vehicle, they can overlap in the side view of the vehicle not only along a majority of their lengths as described above but also along a majority of their heights, allowing the legs 70 not to protrude downwardly from the body member in the storage state of the vehicle.

Referring to FIG. 3D, it is noted that, since the front bar axis $X_{FB}$ does not coincide with the front pivot axis $X_{FP}$, i.e. the bar 52 is at an offset OS with respect to the front pivot axis $X_{FP}$ owing to the articulating member 60, the rotational movement performed by the bar 52 allows positioning it, in the storage state of the vehicle, so that its axis $X_{FB}$ forms an extremely small angle γ with the longitudinal axis L and so that its handlebar end 52B is located above the seat 32 while being positioned so low as to be spaced from the reference plane RP to a distance, which at least does not exceed that between the reference plane RP and the highest point of the front wheel $W_F$. In the present example, the above design allows the foldable backrest portion 37 to close on the handlebar end 52B from above.

Furthermore, as seen in FIG. 3D, in the storage state of the vehicle, the front wheel $W_F$ and the rear wheels $W_R$ (only the left one being shown) do not protrude downwardly from the bottom surface 14 of the body member 10.

Turning now to FIGS. 4A and 4B, a vehicle is shown, generally designated 100, which is configured for being used both as a vehicle which can be ridden by a child alone and as a stroller with its entire front bar 52 being steerable by another person, e.g., an adult, from the rear of the vehicle. The components of the vehicle 100 that are the same as those in the previously described vehicle 1, are designated by the same reference numerals. In addition, the vehicle 100 has a rear steering handle 80 and a rear steering mechanism for converting the rotational movement of the handle 80 into that of the front bar 52.

In particular, the steering mechanism comprises a front rotation member 86 (schematically shown in dotted lines in FIG. 4B) fixedly attached to the front bar 52 and configured for revolving therewith, a rear port 87 disposed within the body member rear portion and configured to be revolved by the steering handle 80, and a pair of right and left steering cable sections 84 extending therebetween within the body member 10, as also shown schematically in dotted lines in FIG. 4B, and fixedly attached with their one end to the front member 86 at two diametrically opposite sides thereof and with their other end to the rear port 87 at its respective diametrically opposite sides.

The arrangement is such that, owing to the fixed attachment of the cable sections 84 to the front member 86 and the rear port 87, pulling on one of the cable sections 84 will cause revolution of the front piece 86 about the longitudinal axis $X_{FB}$ of the front bar 52, thereby causing the front bar 52 to revolve, allowing steering of the vehicle.

The cables sections are made of a bendable material, which can be of the same kind as used for bicycle break cables, allowing them to bend adjacent the front pivot axis $X_{FP}$ when the vehicle 100 is folded from its operational state into its storage state.

FIG. 5A illustrates a vehicle 200, which can also be used as a vehicle configured for being ridden by a child on his own, or as a stroller to be steered via a rear steering handle (not shown) operated by another person. The vehicle 200 generally has the same components as those of the previously described vehicles 1 and 100, with the difference being in that with respect to some of these components of the vehicle 200, more details are provided in FIG. 5B regarding one specific manner, in which they can be implemented. It should be understood however that these components can be generally implemented in other manners. Moreover, FIG. 5B should not be considered as presenting all details of the these components but rather only those described below and designated by reference numerals corresponding to the reference numerals used in the description of the vehicles 1 and 100 with the addition of 200. It should also be noted that FIG. 5B does not show standard or obvious structural elements. It should also be understood that most elements that are shown in this figure in an exploded manner relate to the right side of the vehicle 200 (which is best seen in FIGS. 5A and 5B), which is a mirror image of the left side of the vehicle 200 so, if not indicated otherwise, the same elements as shown for the right side of the vehicle are also present in its left side.

Thus, the vehicle 200 comprises a hollow housing having right and left housing parts 210, each comprising front and rear outer surfaces $215_F$ and $215_R$ (seen only in the right housing part 210), and front and rear inner surfaces $215_F'$ and $215_R'$ (both seen only in the left housing part 210 in FIG. 5B). When the housing parts 210 are assembled along their rims as shown in FIG. 5A, they constitute a body member 210, with the front side surfaces $215_F$ of the two housing parts defining therebetween a body member front portion 211F and the rear side surfaces $215_R$ of the two housing parts defining therebetween a body member rear portion $211_R$. In the present example, the front and rear body portions are spaced from each other by a body member intermediate portion $211_{Int}$, whose outer and inner surfaces (not designated) are disposed between the respective front and rear side surfaces $215_F$ and $215_R$, and front and rear inner surface $215_F'$ and $215_R'$, respectively.

With reference to the right housing part 210 and left rear leg 270 as seen in FIG. 5B, the rear outer surfaces $215_R$ of the two housing parts each belong to a protrusion 217 constituting a part of the body member rear portion $211_R$ formed so that this surface is oriented as described above with reference to the rear surfaces $15_R$ of the vehicle 1. Each protrusion 217 fixedly holds an articulation axle 216 having an outer portion 218 oriented perpendicularly to its rear outer surface $215_R$ and having a free end 219.

Referring to the right and left legs 270 in FIG. 5B, each has a rear leg outer surface 275 and a rear leg inner surface 277 and has a through channel 279 extending therebetween and configured to receive therein from the inner side surface 277 of the leg the outer portion 218 of the articulation axle 216 and from the outer side surface 275 of the leg a stopper 310 configured to be received in a pocket 312, at which the channel 279 terminates, and to fixedly engage the free end 219 of the axle 216 so as to allow pivoting of the leg about the axle while preventing the leg from being dissembled from the axle.

With further reference to the left rear leg 270 in FIG. 5B, each rear leg comprises, at its inner side surface 277, a connection area 278, which in the present example is in the form of a pin protruding therefrom and configured for connecting thereto one of the two longitudinal connection bars 292, with its rear connection end 292B so as to enable pivoting of the connection bar 292 with respect to the rear leg 270. Each connection bar 292 further has front connection end 292A attached to an articulating member 260, which constitutes a part of the front assembly 250.

As shown in FIG. 5B, the articulating member 260 comprises:
- a rear-legs associated portion 266 constituting a part of a connection mechanism 290 (not designated) and having two sides, to which the two connection bars 292 are pivotally connected with their front connection end 292A;
- a body-member associated portion 262, which is pivotally connected to the front body portion 211F (seen in FIG. 5A); and
- a front-bar associated portion 264 rotatably receiving therein a lower portion 252A of the front bar 252 so that an upper portion 252B of the front bar is free of direct connection to the articulating member.

The upper and lower portions 252A and 252B of the front bar 252 are assembled with each other so that, when locked to each other by a locker 320 (seen in both FIGS. 5A and 5B), they are fixedly connected to each other to constitute a single integral front bar unit and, when unlocked from each other, they become functionally disconnected, allowing the lower portion to be steered by a rear steering mechanism described in detail below, and allowing the upper portion to either have a fixed orientation or to be rotatable independently from the lower portion.

As further shown in FIG. 5B, the vehicle 200 is provided with a right and a left locking mechanism for locking the articulating member 260 in its operational orientation, both locking mechanisms operating along the front pivot axis $X_{FP}$, each comprising:
- a spring-loaded locking element 265 having a pattern of protrusions along its circumference (the spring being separately designated at 267);
- a locking cavity 268 formed at the front inner surface $215_F'$ of the corresponding housing part 210 (seen in the left housing part in FIG. 5B) and having a circumferential pattern of recesses corresponding to the pattern of protrusions of the locking element so as to enable the locking cavity to fittingly receive therein the spring loaded locking element 265 in its operational orientation;
- an articulation cavity 271 formed in the body-member associated portion 262 of the articulation member 260 at its side facing the corresponding housing part, and having a circumferential pattern of recesses corresponding to the pattern of protrusions of the locking element 265; the articulation cavity 271 permanently receives therein the spring 267 and the locking element 265 and is configured to allow the locking element to enter deeper into the articulation cavity when an axial pressing force is exerted thereon and the spring is pressed accordingly;

a button 261 having prongs 281 and correspondingly shaped through passages 283 formed in the housing part 210 so as to extend between its inner and outer front surfaces 215$_F$' and 215$_F$ thereof, the through passages being configured to receive therein the prongs 281 of the button both when the button is in its outermost position in the operational and storage states of the vehicle 200, and when it is pressed into its innermost position for exerting, by its prongs 281, the axial pressing force on the spring-loaded locking element 265; and a cover 299 covering the body-member associated portion 262 and the front-bar associated portion 264 of the articulating member 260 and having an opening 285 for accommodating therein the button 261 so as to allow access thereto by the user for pressing the button, when needed.

Thus, in the operational state of the vehicle 200, the spring-loaded locking elements 265 are in their locking position, each being accommodated in the locking cavity 268 and protruding into the articulation cavity 271 to a minimal extent. When the state of the vehicle 200 is to be changed from its operational state to its storage state, the right and left locking mechanisms are operated simultaneously to unlock the articulating member 260 and to thereby allow its pivoting about the front pivot axis X$_{FP}$ from its operational orientation to its storage orientation as described above with reference to the vehicle 1.

The unlocking is initiated by pressing the right and left buttons 261, and thereby causing the prongs 282 to exert the axial pressing force on the locking elements 265 causing them to move out of the locking cavity 268 into the articulation cavity 271 to a maximal extent. In this unlocking position, the locking elements 265 can no longer prevent the articulating member 260 from being pivoted with respect to the body member 210, and they pivot together with the articulating member 260 and stay so engaged until the articulating member 260 with the locking elements 265 is pivoted back into its operational orientation, thereby bringing the locking elements into alignment with the locking cavities 268. When this alignment is achieved, each locking element 265 is pushed by its corresponding spring 267 back into its locking position within the locking cavity 268.

The vehicle 200 further comprises a rear steering mechanism for use with the handle 80 (not shown in FIGS. 5A and 5B) as described with respect to the vehicle 100 shown in FIGS. 4A and 4B, converting the pivotal movement of the handle into that of the front bar 252. The steering mechanism comprises:

the front rotation member 286 disposed inside the front-bar associated portion 264 of the articulating member 260, which is fixedly attached to the front bar 252 and configured for revolving therewith;

a rear port 287 having a pair of right and left steering cable sections 284 fixedly attached thereto at their one end and fixedly attached with their other end to the front rotation member 286 so that pulling on one of the cable sections 284 will cause revolution of the front rotation member 286 with the front bar 252, allowing steering of the vehicle;

a rear port cup 289 whose interior merges with a cable passage (not designated), the cup (shown assembled with the housing left part), being fixed within the body member rear portion 211$_R$, so as to receive therein the rear port 287 in a manner allowing the port to be rotated by the handle 80, with the cable sections 284 passing through the cable passage, via the interior of the body member 210 towards the front piece 286.

To ensure that the right and left cable sections 284 will be bent as desired when the vehicle is folded from the operational state into the storage state by pivoting the articulation member 260 together with the front bar 252 and the front member 286, the cable sections extend within the body member 210 so that each of them passes between the prongs 281 of the respective right or left button 261 allowing the prongs to fix the locations of the cable sections, at which they are to be bent.

The vehicle 200 further comprises a front bar locking clamp 300 attached to its securing frame 236 for locking the upper portion 252B of the front bar 252 to the securing frame 236, when in its operational orientation (as seen in FIG. 5B), allowing this portion to have a fixed orientation when the lower portion of the front is steered.

Finally, the pedals P of the vehicle are mountable both to the front wheel W$_F$ as described above and shown in FIG. 5A, allowing the vehicle to be ridden by a child accommodated therein, and to the articulating member 260 at its rear-legs associated portion 266 as shown in FIG. 5C, to constitute a footrest disposed closer to the seat arrangement 30 than the front wheel W$_F$ and thus facilitate the use of the vehicle 200 as a stroller. The seat arrangement 30 can be configured for mounting in at least two positions one—as shown in FIGS. 5A and 5C, and the other (not shown)—closer to the front bar 252.

The invention claimed is:

1. A personal vehicle configured for accommodating a child therein and having an operational state and a storage state, the personal vehicle comprising:

a front wheel and at least one rear wheel;

a body member having front and rear portions including corresponding front and rear ends spaced from each other along a longitudinal axis, the rear portion being associated with the at least one rear wheel; the body member having an upper surface;

a front bar having a front bar axis, an upper portion associated with handlebars and a lower portion associated with said front wheel; the front bar being connected to the front end of the body member by an articulating member allowing pivotable articulation, about a front pivot axis, of at least one of the front bar and the body member with respect to each other, to bring the vehicle into said storage state, in which the front bar extends along the upper surface of the body member; and a seat mounted to the upper surface of the body member so as to be supported at least partially by the rear portion of the body member, and a backrest connected to the seat, the backrest having a stationary backrest portion and a foldable backrest portion pivotable between an upright orientation in the operational state of the vehicle and a transverse orientation in the storage state of the vehicle, in which the foldable backrest portion is oriented transversely to the stationary backrest portion and such as to at least partially cover the front bar upper portion.

2. The personal vehicle according to claim 1, wherein the foldable backrest portion is pivotable about an axis spaced from the seat by the stationary backrest portion.

3. The personal vehicle according to claim 2, further comprising a securing frame connected to the backrest so as to be pivotable about the same axis as the foldable backrest portion, between an operational orientation, in which the securing frame can prevent a child seated in the seat from falling off, and a non-operational upright orientation, both orientations being available in the operational state of the vehicle.

4. The personal vehicle according to claim 1, further comprising a securing frame capable of being brought between an operational orientation in the operational state of the vehicle, in which the securing frame can prevent a child seated in the seat from falling off, and a non-operational orientation in which the securing frame is aligned with the foldable backrest portion at least in the storage state of the vehicle.

5. The personal vehicle according to claim 1, wherein the upper and lower portions of the front bar are configured to be locked to each other to behave as a single integral unit and unlocked from each other allowing the lower portion to be manipulated independently of the upper portion.

6. The personal vehicle according to claim 5, wherein the upper and lower portions of the front bar are locked to each at least in the storage state of the vehicle.

7. The personal vehicle according to claim 1, wherein in the operational state of the vehicle, the front bar axis forms an angle with the longitudinal axis of the body member which is essentially greater than that in the storage state of the vehicle.

8. The personal vehicle according to claim 7, wherein in the storage state of the vehicle the angle is not greater than 25 degrees.

9. The personal vehicle according to claim 1, wherein the articulating member has a front-bar associated portion, which embraces the front bar in a manner allowing at least a portion of the front bar to revolve about the front bar axis; and a body-member associated portion, at which the articulating member is pivotally articulated to the front end of the body member.

10. The personal vehicle according to claim 1, wherein in the storage state of the vehicle, the foldable backrest portion covers the handlebars at least along a majority of their total length.

11. The personal vehicle according to claim 1, wherein in the storage state of the vehicle, the front bar extends along the upper surface of the body member along at least a majority of the length of the front bar.

12. The personal vehicle according to claim 11, wherein in the storage state of the vehicle, the front bar overlies the upper surface of the body member along at least a majority of the length of the front bar.

\* \* \* \* \*